United States Patent
Minabe et al.

(10) Patent No.: US 6,512,085 B1
(45) Date of Patent: Jan. 28, 2003

(54) METHOD AND APPARATUS FOR PROVIDING OPTICAL ANISOTROPY TO POLYMERIC FILM AND OPTICAL ANISOTROPIC MEDIUM

(75) Inventors: Jiro Minabe, Nakai-machi (JP); Katsunori Kawano, Nakai-machi (JP); Yasunari Nishikata, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 155 days.

(21) Appl. No.: 09/690,589

(22) Filed: Oct. 18, 2000

(30) Foreign Application Priority Data

Jan. 20, 2000 (JP) .......................................... 2000-012140

(51) Int. Cl.[7] .................................................. C08F 6/00
(52) U.S. Cl. ........................ 528/480; 349/117; 349/119; 359/494; 359/500
(58) Field of Search ...................... 528/480; 428/64.4; 349/117, 119; 359/494, 500

(56) References Cited

FOREIGN PATENT DOCUMENTS

| | | |
|---|---|---|
| JP | A-10-340479 | 12/1998 |
| JP | A-11-160708 | 6/1999 |
| JP | A-11-231133 | 8/1999 |
| JP | A-11-238251 | 8/1999 |

OTHER PUBLICATIONS

Sekket et al., *Photoassisted Poling of Azo Dye Doped Polymeric Films at Room Temperature*, Appl. Phys. B 54, 486–489 (1992).
Guth et al., *Macromolecular Symposia*, Wiley–VCH Verlag GmbH, D–69469 Weinheim, pp. 129–136 (1999).
Nakagawa et al., *Optical Phase Conjugation in Polyester with Cyanoazobenzene units in the Side Chain*, Optical Review, vol. 2, No. 6, pp. 460–462 (1995).
Nakagawa et al., *Holographic Recording In Polyesters Having Cyanoazobenzen Units in the Side Chain*, Optics for Science and New Technology, pp. 571–572, (1996).
Sato et al., *Synthesis and Properties of Polyesters Having Cyanoazobenzene Units in the Side Chain*, Macromol. Rapid Commun, 15, pp. 21–29, (1994).
Yamada et al., *Optical Storage of Photoinduced Anistrophy in Polyester with Cyanoazobenzene Units in the Side Chain*, pretext for 58th Autumn Meeting, The Japan Soceity of Applied Physics, (1997).
Natansohn et al., *Azo Polymers for Reversible Optical Storage 4, Cooperative Motion of Rigid Groups in Semicrystalline Polymers*, pp. 2580–2585, (1994).
Brown et al., *Azo Polymers for Reversible Optical Storage. 5. Orientation and Dipolar Interactions of Azobenzene Side Groups in Copolymers and Blends Containing Methyl Methacrylate Structural Units*, Macromol. 28, pp. 6116–6123 (1995).
Minabe et al., *Holographic Recording an Reconstruction of Polarized light with Azo Polymer (IV)—Effect of Light Intensity on Photoinduced Birefringence*, pretext for 48th Spring Meeting, the Japan Society of Applied Physics, (1999).

*Primary Examiner*—Terressa M. Boykin
(74) *Attorney, Agent, or Firm*—Oliff & Berridge, PLC

(57) ABSTRACT

A method of providing a polymeric film with optical anisotropy by applying a polarized light to a polymeric film is disclosed. In the method, a photoisomerizable group or a photoisomerizable molecule has a T (thermal) type photochromic property capable of being isomerized by a thermal back reaction after the isomerization by light. The method includes two successive steps, that is, a step of applying a polarized light to the polymeric film and a step of shutting off a polarized light and leaving the film as it is, and controls the temperature of the polymeric film for enhancing the orientation of the photoisomerizable group or the photoisomerizable molecule induced by the thermal back reaction. An apparatus for practicing the method and an optical anisotropic medium having the polymeric film with high optical anisotropy obtained by the method are also provided.

20 Claims, 9 Drawing Sheets

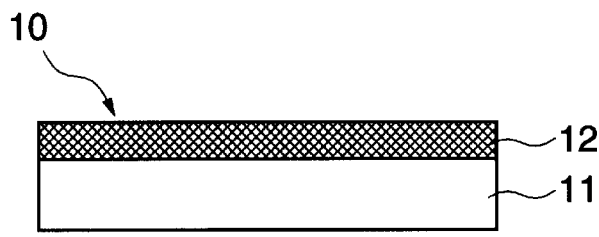
*FIG.3A*
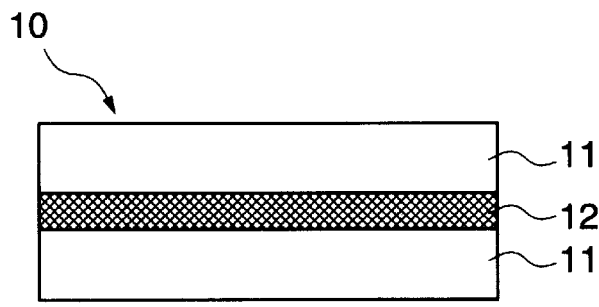
*FIG.3B*
*FIG.3C*
*FIG.4*
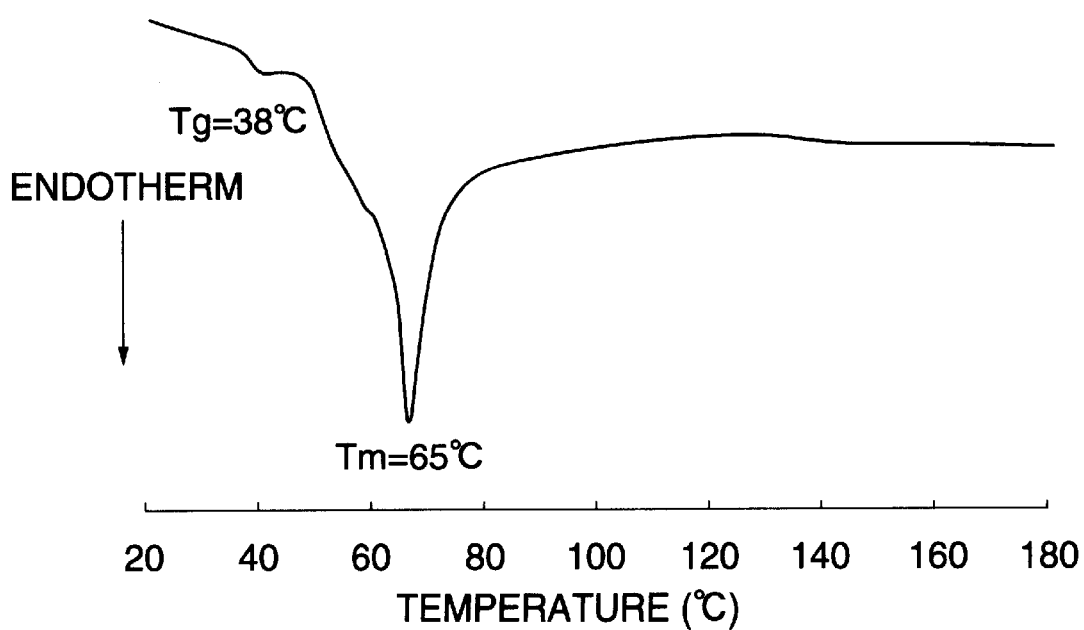

POLARIZATION MODULATION

REFERENCE LIGHT

OBJECT LIGHT

METHOD AND APPARATUS FOR PROVIDING OPTICAL ANISOTROPY TO POLYMERIC FILM AND OPTICAL ANISOTROPIC MEDIUM

BACKGROUND OF THE INVENTION

1. Field of the Invention

The present invention relates to a method of and an apparatus for greatly inducing and fixing a photoinduced anisotropy (reorientation, birefringence and dichroism) of a medium by the irradiation of polarized light, as well as a photoinduced anisotropic medium prepared therewith and, particularly, it relates to a method of and an apparatus for preparing liquid-crystal-aligning films, wave plates, phase retarders, optical waveguides, non-linear optical elements and optical recording media by bit recording or holographic recording, as well as photoinduced anisotropic media thereof.

2. Description of the Related Art

The technique of orienting organic materials in solid state films have been studied vigorously in the application field of optoelectronics such as liquid-crystal-aligning films, as well as wave plates, phase retarders, diffraction gratings, optical waveguides, non-linear optical elements and optical recording. Among them, a method of controlling the orientation by the irradiation of polarized light has been noted particularly in recent years since this is a non-contact orientation method and capable of easily forming an optional orientation pattern in the film and has a possibility of application to optical devices utilizing active orientation change with light.

When a polarized light is applied to dichroic molecules in a state where molecular motion is restricted, only the molecules with the polarization axis and the transition dipole moment being aligned are excited selectively to cause optical anisotropy. This phenomenon is referred to as Weigert's effect and reported in the 1920s. This is explained, for example, to azobenzene as a photoisomerizable molecule. Azobenzene shows trans-cis isomerization under the irradiation of light. It takes a molecular structure as shown in the chemical formula (a) in the trans-form, while a molecular structure as shown in the chemical formula (b) in the cis-form.

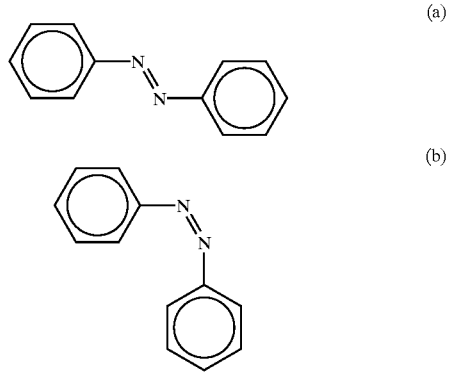

Azobenzene shows anisotropy as an individual single molecule. But a film prepared by coating from a solution in a state they are bonded or dispersed in a polymer shows isotropy as a whole reflecting the isotropic conformation of the solution (refer to FIG. 1A). When a linearly polarized light at a wavelength to which azobenzene is sensitive is applied, only the molecules of azobenzene arranged in the direction identical with the polarizing direction absorb light due to the dichroism of azobenzene and are isomerized into a cis-form. Since the isomerized cis-form is thermally unstable, it is again isomerized into a transform by thermal back reaction. The trans-form in this case can be in any of orientation states identical with or perpendicular to the polarization direction (polarization axis), but the trans-form in the direction identical with the polarizing direction changes again by photoisomerization into the cis-form and, subsequently, is isomerized again into a trans-form by thermal back reaction. In the process of repeating the trans-cis-trans isomerization cycle defined by the polarization direction, change of orientation is caused in the direction of less absorption to the exciting polarized light (perpendicular direction to the polarization axis) (refer to FIG. 1B). In this case, change of the orientation of the polymer is induced by the isomerization and the change of orientation of azobenzene in addition to the change of the orientation of azobenzene to cause large anisotropy in the medium with the polarization direction as an axis (or in perpendicular thereto).

A method of manufacturing a liquid-crystal-aligning film or wave plate (optical phase retarder) utilizing such photoinduced anisotropy is proposed, for example, in Japanese Published Unexamined Patent Application No. Hei 11-231133. Further, as an optical recording method utilizing the recording characteristic of the photoinduced anisotropy, a holographic recording method (Japanese Published Unexamined Patent Application No. Hei 10-340478) or polarization multi-level recording (Japanese Published Unexamined Patent Application No. Hei 11-238251) are also proposed. Further, there are various application uses such as manufacture of optical waveguides or optical switches utilizing the change of refractive index by orienting non-linear chromophore such as azo dyes by irradiation of polarized light. In such cases, it is important to obtain a large birefringence by inducing and maintaining high orientation.

As a method of inducing higher orientation, in the method of light orientation using irradiation of polarized light, a method of using irradiation of polarized light together in the orientation by electric fields (Photoassisted Electrical Poling: PAEP) is proposed (Z. Sakkat, et al. "Photoassisted poling of azo dye doped polymeric films at room temperature", Appl. Phys. B54, 486–489 (1992)). However, since an electrode is required in contact with the film surface for efficiently applying the electric field or it is difficult to form a fine optional orientation pattern, it is not practical in the application, for example, to liquid-crystal-aligning films or diffraction gratings.

As another method, Japanese Published Unexamined Patent Application No. Hei 11-160708 discloses a method of producing an oriented resin film of applying a linearly polarized light or a non-polarized light in an oblique direction and then further applying a heat treatment. This enables to transform the polymer into a liquid crystal or crystalline state and highly stabilize the orientation by the heat treatment. This is explained as a mechanism that the effective cooperative works among the polar and rigid azobenzene moieties induces a large orientation (K. Ichimura, et al. "Thermally stable photoaligned p-cyanoazobenzene moieties in polymer thin films", Macromol. Symp. 137, 129–136 (1999)).

However, since scattering attributable to the liquid crystal or crystalline state forms noises for optical elements in the application for thick films, for example, volume holographic memory, this is not suitable to polymers that have a liquid crystalline phase or a high crystalline property. Further, it is difficult to stabilize polymers that have no liquid crystalline phases or a low crystalline property by the heat treatment described above. FIG. 2 shows a result of preparing a film by using a polyester (refer to Chemical Formula 5), applying a linearly polarized light to a region of 1 mmφ thereby inducing and recording birefringence and applying a heat treatment to such a film to be described later. The effect of enhancing the orientation by the heat treatment is scarcely observed and it can be seen that the induced birefringence is remarkably attenuated at a temperature higher than the glass transition temperature ($T_g$=38° C.) of this polymer. Further, since the effect of enhancing the orientation by this prior art essentially relies on the intermolecular force, it is considered that the effect is higher for uniform orientation in one direction but it is difficult to enhance fine orientation distribution at the submicron order by heat treatment.

When the change of the refractive index is applied to a wave plate, the thickness of the element can be reduced as the birefringence is larger and noises such as aberration depending on the element can be reduced. When a waveguide is manufactured, more modes can be propagated as the change of the refractive index is larger. Further, when manufacturing an optical switch having a waveguide layer in which non-linear chromophore such as an azo dye is oriented, second or third non-linearity can be increased by high orientation. Considering the application to the holographic memory, the recording multiplicity can be increased as the change of the refractive index is larger, and larger capacity memory can be attained. Also in the invention of a polarization multi-level recording (Japanese Published Unexamined Patent Application No. Hei 11-238251), if the change of the refractive index can be made larger, the thickness of the recording material can be reduced to decrease the effect of errors due to the change of the thickness of the medium.

However, in the light orientation method of the prior art described above (Japanese Published Unexamined Patent Application Nos. Hei 11-231133, Hei 10-340479, Hei 11-238251), the induced birefringence is about 0.05 which is not large enough for the application use such as orientation films, wave plates, optical memories or waveguides. For putting them into practical use, a method and an apparatus capable of maintaining the orientation stably and obtaining high birefringence are essential. Further, in the application for thick films, there is a subject in the scattering of the light orientation medium attributable to the liquid crystal or crystalline property. Furthermore, for the application to the holographic memory, a resolving power for forming and enhancing the orientation distribution at the submicron order is necessary.

"Optical phase conjugation in polyesters with cyanoazobenzene units in the side chain" by K. Nakagawa, et al, OPTICAL REVIEW 2, 460–462 (1995), shows that the polyester film having cyanoazobenzene in the side chain shown by "Chemical Formula 5" to be described later is prospective as a phase conjugate mirror. The material generates a phase conjugated light by photoinduced anisotropy attributable to the photoisomerization of azo group and is capable of holographic recording. Further, the paper shows that the holographic grating is developed after the holographic recording. However, this mechanism was not clear.

SUMMARY OF THE INVENTION

This invention intends to provide a polymeric film having high optical anisotropy by a simple method, provide an apparatus therefor, as well as to provide a polymeric film having high optical anisotropy obtained by the method described above and an optical anisotropic medium having such a polymeric film.

This invention can be attained by the provision of the following aspects as the method, the apparatus and the optical anisotropic medium to be described later.

(1) A method of providing a polymeric film with optical anisotropy by applying a polarized light to a polymeric film containing a photoisomerizable group in the molecule or a polymeric film containing photoisomerizable molecules in which the photoisomerizable group or the photoisomerizable molecule has a T (thermal) type photochromic property capable of being isomerized by thermal back reaction after being isomerized by light, the method including two successive steps, that is, a step of applying a polarized light to the polymeric film and a step of shutting off the polarized light and leaving the same as it is, in which temperature of the polymeric film is controlled for enhancing the orientation of the photoisomerizable group or the photoisomerizable molecule induced by the thermal back reaction in at least one of the two steps.

(2) A method according to (1) above, wherein the temperature of the polymeric film is controlled in both of the two steps.

(3) A method according to (1) above, wherein the temperature is controlled such that the temperature of the polymeric film is within ±7° C. of a glass transition temperature $T_g$ of the polymer in at least one of the two steps.

(4) A method according to (1) above, wherein the temperature is controlled such that the temperature of the polymeric film is at the glass transition temperature $T_g$ of the polymer in at least one of the two steps.

(5) A method according to (1) above, wherein, in the step of shutting off the polarized light and leaving the polymeric film as it is, the temperature of the polymeric film is controlled so as to be equal to or higher than the temperature of the polymeric film in the step of applying the polarized light.

(6) A method according to (1) above, wherein the time of applying the polarized light is set to $\tau_a$ or longer when the change of the photoinduced birefringence Δn relative to the polarization irradiation time t in the step of applying the polarized light is approximated by the following biexponential equation:

$$\Delta n = A \cdot \{1 - \exp(-t/\tau_a)\} + B \cdot \{1 - \exp(-t/\tau_b)\} \quad (\tau_a \leq \tau_b)$$

where Δn represents a photoinduced birefringence, A and B each represents contribution of each of the components to the birefringence, $\tau_a$ and $\tau_b$ each represents a time constant for each of relaxation components and t represents the time for irradiation of the polarized light.

(7) A method according to (6) above, wherein the time of applying the polarized light is set to $6\tau_a$ or longer when the change of the photoinduced birefringence Δn relative to the polarization light irradiation time t in the step of applying the polarized light is approximated by the biexponential equation.

(8) A method according to (1) above, wherein the temperature of the polymeric film is controlled by adjusting the irradiation intensity or irradiation power of the polarized light.

(9) A method according to (1) above, wherein the main chain of the polymer contains an aromatic hydrocarbon ring.

(10) A method according to (9) above, wherein the aromatic hydrocarbon ring is two or more benzene rings connected by way of a connection group.

(11) A method according to (1) above, wherein the photoisomerizable group or the photoisomerizable molecule contains an azo group.
(12) A method according to (1) above, wherein the polymer having the photoisomerizable group is a polymer in which an azobenzene derivative is introduced in the side chain.
(13) A method according to (9) above, wherein the polymer having the photoisomerizable group is a polymer in which an azobenzene derivative is introduced in the side chain, and the azobenzene derivative is connected to the aromatic ring of the main chain.
(14) A method according to (1) above, wherein the polymer having the photoisomerizable group is a polyester resin shown by the following structural formula:

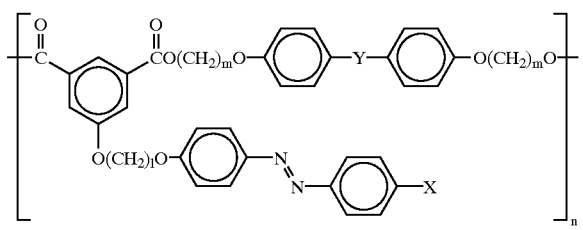

in which X represents a cyano group, a methyl group, a methoxy group or a nitro group, Y represents an ether bond or a ketone bond, 1 and m each represents an integer from 2 to 18 and n represents an integer from 5 to 500.
(15) A method according to (14), wherein the polymer having the photoisomerizable group is a polyester resin of the structural formula, in which 1 and m each represents an integer from 4 to 10 and n represents an integer from 10 to 100.
(16) An apparatus used for the method of providing a polymeric film with optical anisotropy by applying a polarized light to a polymeric film containing a photoisomerizable group in the molecule or a polymeric film containing photoisomerizable molecules in which the photoisomerizable group or the photoisomerizable molecule has a T (thermal) type photochromic property capable of being isomerized by thermal back reaction after being isomerized by light, the apparatus including a light source for applying a polarized light to the polymeric film and a temperature control unit that controls the temperature of the polymeric film.
(17) An apparatus according to (16) above, wherein the light source also serves as the temperature control unit.
(18) A polymeric film provided with optical anisotropy prepared by the method as described in (1).
(19) An optical anisotropic medium having a polymeric film provided with optical anisotropy prepared by the method as described in (1).
(20) A liquid-crystal-aligning film having a polymeric film provided with optical anisotropy prepared by the method as described in (1).

BRIEF DESCRIPTION OF THE DRAWINGS

Preferred embodiments of the present invention will be described in details based on the followings, wherein

FIGS. 3A to 3C are views showing a light orientation medium used for the light orientation method according to this invention;

FIG. 4 is a graph showing a DSC curve of a polyester shown by the Chemical Formula 5;

DESCRIPTION OF THE PREFERRED EMBODIMENTS

Figure 1A:
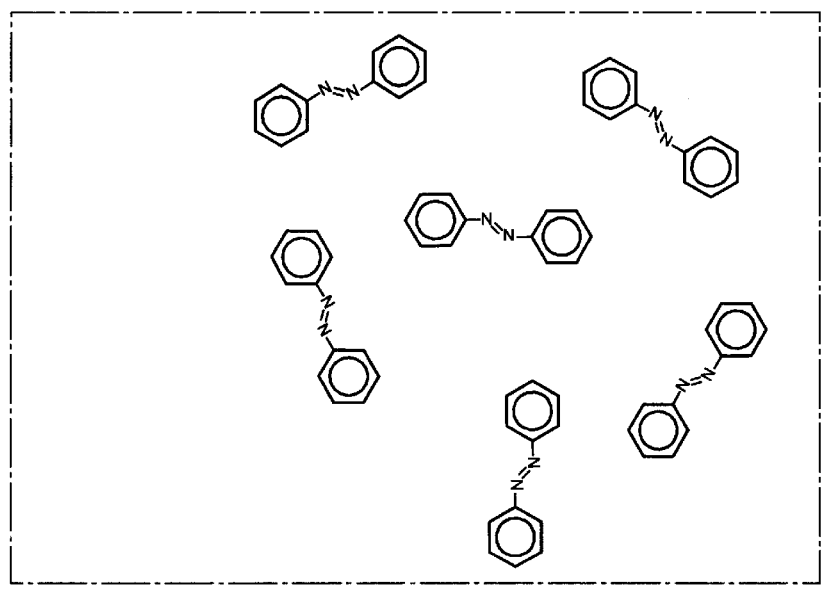
FIGS. 1A to 1C are conceptional views for explaining the state of azobenzene which is photoisomerized by selective absorption of a polarized light and isomerized and oriented by thermal back reaction.

The inventor has noted on the effect of development for the holographic grating after holographic recording described in "Optical phase conjugation in polyesters with cyanoazobenzene units in the side chain" by K. Nakagawa, et al described above, OPTICAL REVIEW 2, 460–462 (1995), and has attempted to analyze the mechanism thereof. As a result, it has been found that a driving source for the development of the holographic grating after shutting off the polarized light is an isomerization reaction from the cis-form to the trans-form by the thermal reaction and interaction between the rigid segments of the polymer. That is, orientation changes by the trans-cis-trans isomerization cycle of cyanoazobenzene based on the selective photoisomerization reaction upon irradiation of the polarized light. When the polarized light is shut off, the cis-form of cyanoazobenzene increased by the irradiation of the polarized light is isomerized to the trans-form by the thermal reaction, which strongly undergoes the effect mainly of the orientation state induced in the side chain portion and, as a result, it exerts in the direction of increasing the orientation. Further, the thermal isomerization reaction from the cis-form to the trans-form also induces the change of orientation in the main chain portion.

However, in the existent orientation method by light, that is, a method of irradiating a polarized light without (special) temperature control, this phenomenon cannot be utilized effectively for enhancing the optical anisotropy. In the polyester film described above (refer to Chemical Formula 5), the birefringence during shutting of the polarized light only increases scarcely (by several % or less) (K. Nakagawa, et al. "Holographic recording in polyesters having cyanoazobenzene units in the side chain", Proc. SPIE 2778, 571–571 (1996)).

In view of the above, the inventor has further made earnest studies for effectively utilizing this phenomenon to a method of obtaining an optical anisotropy (birefringence or the like) medium and, as a result, has reached a method of obtaining a medium of high photoanisotropy.

In this invention, for obtaining a optical anisotropic polymer film, a polymeric film containing a photoisomerizable group in the molecule or a polymeric film containing photoisomerizable molecules in which the photoisomerizable group or the photoisomerizable molecule has a T (thermal) type photochromic property capable of being isomerized by thermal back reaction after being isomerized by light, is used and provided with the optical anisotropy by the method to be detailed below.

FIG. 1 schematically shows the phenomenon occurring upon irradiation of a polarized light and after shutting the polarized light in a case of irradiating a polarized light to the polymeric film (azobenzene is explained as an example of the photoisomerizable group).

Azobenzene has the light polarization sensitivity that originates from the anisotropic shape of the molecule. The transition dipole moment is along the long principal axis. Consequently, the probability of photoisomerization is proportional to the cosine square of the angle between the transition moment and the light polarization direction. Accordingly, the azobenzenes aligned parallel to the light polarization have the highest probability of being isomerized. On the other hand, the azobenzenes aligned perpendicular to the light polarization are stable to the polarized light. When the polarized light is applied to the film having isotropic configuration (refer to FIG. 1A), the azobenzene aligned parallel to the light polarization are isomerized selectively. Then, the excited cis-forms are easily isomerized to trans-form by thermal back reaction or photoisomerization. Under irradiation of the polarized light, isomerization cycle of trans-cis-trans defined by the polarization direction is repeated and orientation of azobenzene changes in the direction with less absorption to the polarized light (perpendicular direction to the polarization axis) (refer to FIG. 1B). Further, change of orientation of the polymer is also induced by isomerization and change of orientation of azobenzene in addition to the change of orientation of azobenzene.

Figure 1B:
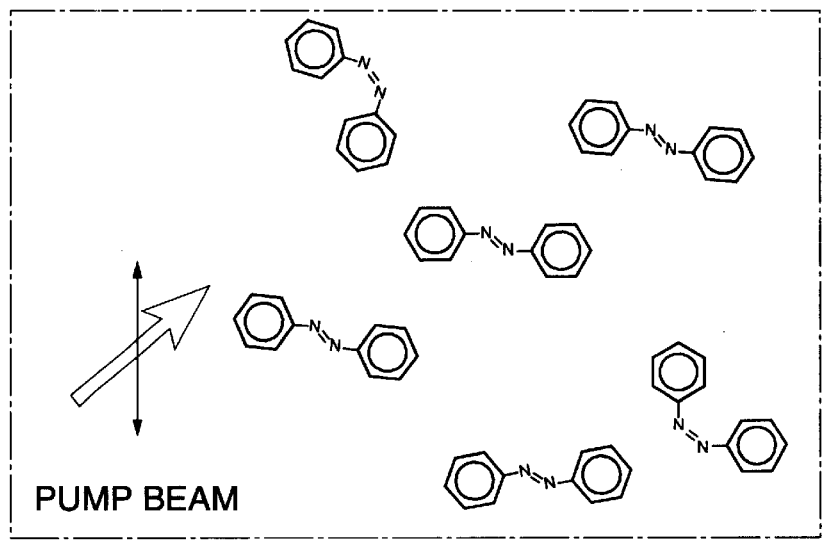
Figure 1C:
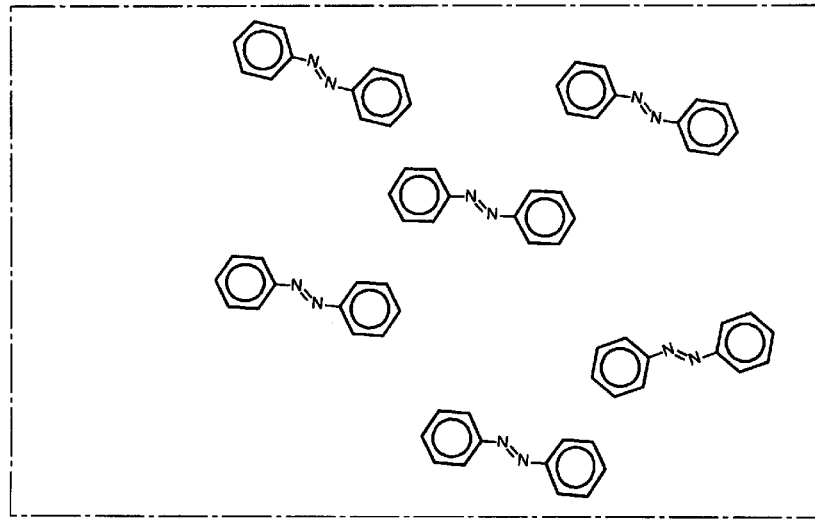

At the instance the irradiation of the polarized light is shut off, the cis-forms increase (refer to FIG. 1B) in comparison with the prior state (refer to FIG. 1A). Then, the cis-forms relax into the trans forms by thermal back reaction. Generally, the orientation after the irradiation is increased by thermal randomization or slightly increased. However, by use of the materials, the apparatuses and the methods in this invention, the orientation can be remarkably enhanced after shutting the polarized light off. The effect of the invention originates from the cis-trans thermal back reaction and interaction between the rigid segments of the material. That is, when the cis-forms relax into the trans forms, the azobenzenes tend to align along the neighboring segments that have been oriented (refer to FIG. 1C). The enhanced orientation simultaneously causes optical anisotropy (birefringence) (refer to FIG. 1C). Further, the optical anisotropy increases by promoting the orientation also upon irradiation of the polarized light. Further, as a result of increase in the orientation of the photoisomerizable group or photoisomerizable molecule, orientation of the polymer main chain is further promoted. This invention is based on this finding.

This invention has a feature in controlling the temperature for the polymeric film in at least one of the polarized light irradiation step and the step of shutting off the polarized light and leaving the same as it is for promoting the orientation and providing the polymeric film with high optical anisotropy upon isomerization of the photoisomerizable group or the photoisomerizable molecule by the thermal back reaction.

That is, the temperature control in this invention can promote the thermal back reaction from the cis-form to the trans-form, simultaneously enhance the mobility of the polymer segments (and molecules) and, further, positively exert the cooperative mobility between the segments increasing in the vicinity of the glass transition temperature to the change of orientation.

In the following explanation, proceeding of the orientation in the photoisomerizable group or the photoisomerizable molecule or, in addition, the polymer main chain by irradiation of a polarized light to a polymeric film having photoisomerizable group or photoisomerizable molecule is sometimes referred to as "light orientation" and the method is sometimes referred to as "light orientation method".

Then, an explanation is to be made to a polymeric film containing a photoisomerizable group in the molecule or a polymeric film containing photoisomerizable molecules in which the photoisomerizable group or the photoisomerizable molecule has a T (thermal) type photochromic property capable of being isomerized by thermal back reaction after being isomerized by light to be used in the method according to this invention.

At first, an explanation will be made to a polymer containing photoisomerizable groups in the molecules. The photoisomerizable group is a group having T (thermal) type photochromic property which can be isomerized by thermal back reaction after isomerization by light and there is no particular restrictions on the group so long as the photoisomerizable group is oriented by such isomerization and optical anisotropy (birefringence or dichroism) is induced. But preferable are those causing selective photoisomerization reaction by the irradiation of a polarized light, for example, those causing only the molecules in parallel with the polarization axis to absorb the light to bring about geometrical photoisomerization reaction. The isomerization can include not only cis-trans isomerization but also syn-anti-isomerization.

The photoisomerizable group described above can include those groups having an azobenzene structure substituted with cyano group, alkyl group (1 to 8 carbon atoms) such as methyl group or n-butyl group, trifluoromethyl group, phenyl group, cycloalkyl group such as cyclohexyl group, alkoxy group (1 to 6 carbon atoms) such as methoxy group or trifluoromethoxy group, nitro group, ethoxy carbonyl group, or halogen atom such as fluorine atom, as well as those groups having a structure such as of stilbene, azomethine, indigo and thioindigo. Among them, photoisomerizable groups containing the azo group are preferred and, particularly, those groups containing azobenzene substituted with cyano group, methyl group, methoxy group or nitro group are preferred.

Further, the photoisomerizable group described above is preferably present on the side chain of the polymer. The main chain of the polymer may be either an addition type polymer or a condensation type polymer. The addition type polymer can include, for example, acrylate type polymer or methacrylate type polymer. In the case of the acrylate type polymer or the methacrylate type polymer, azobenzene is connected by way of —COO—(CH)$_n$—O— with the polymer. Further, the condensation type polymer can include, for example, polyester series, polyimide series, polysiloxane series, polyurethane series and polyurea series, among them, polyester series being particularly preferred.

Further, when a polymer in which the change of orientation of the polymer is induced by thermal isomerization and change of orientation of the photoisomerizable group is used, the effect of increasing the birefringence can be attained efficiently. For this purpose, it is desirable that the interaction between the rigid segments in the side chains and/or the main chains is appropriately strong. For example, it is preferred that a rigid portion constituted with an aromatic hydrocarbon ring is contained in the main chain of the polymer. Further, since the aromatic hydrocarbon ring has a large anisotropy of polarizability, it also contributes much to the birefringence due to the change of orientation. The aromatic hydrocarbon ring can include two or more benzene rings connected by a connection group. The connection group can include an ether bond, ketone bond or the like.

Further, those in which the azobenzene derivative is connected to the aromatic ring in the main chain is preferred.

Further, the photoisomerizable group is preferably contained at least in one of repeating units of the main chain of the polymer, but it may be a copolymer with a constituent unit having no photoisomerizable group in the side chain.

Among them, a polyester represented by the following structural formula is preferred as a polyester having the photoisomerizable group in the side chain.

[Chemical Formula 4]

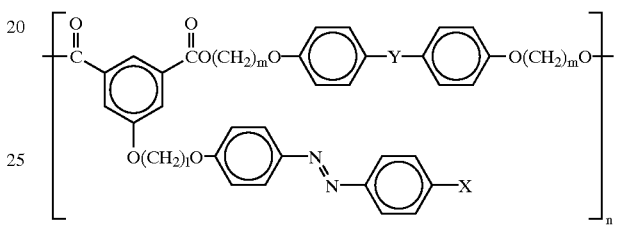

wherein X represents a cyano group, a methyl group, a methoxy group or a nitro group, Y represents an ether bond or a ketone bond, l and m each represents an integer from 2 to 18, more preferably, an integer from 4 to 10, and n is an integer from 5 to 500, more preferably, an integer of from 10 to 100.

Concrete examples of the polyester shown by the structural formula described above will be mentioned below but they are not restricted thereto.

[Chemical Formula 5]

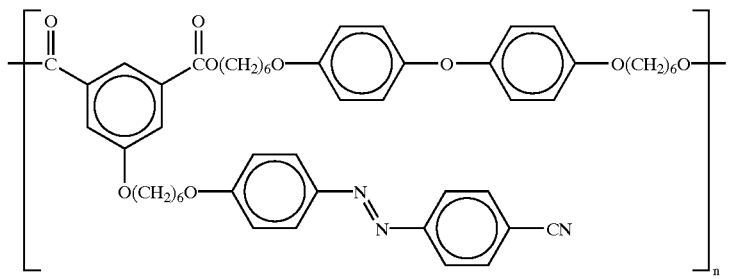

[Chemical Formula 6]

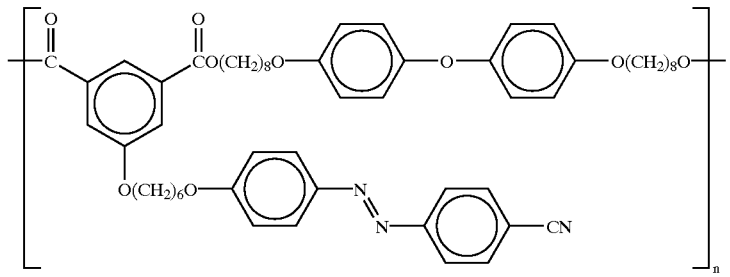

Tg = 26.8° C., Tm = 56.4° C.

-continued
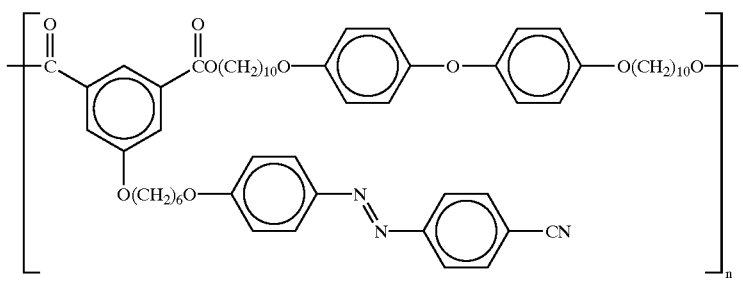
Tg = 23.9° C., Tm = 62.7° C.
[Chemical Formula 7]
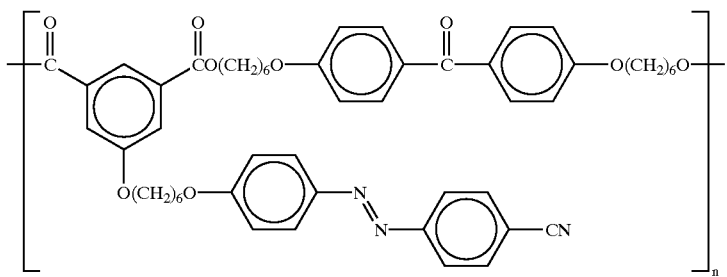
Tg = 48.5° C., Tm = 82.2° C.
[Chemical Formula 8]
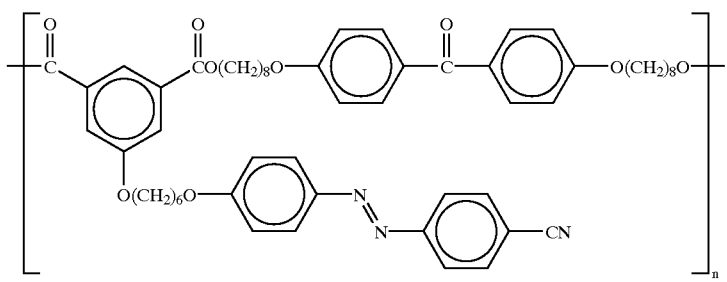
Tg = 37.8° C., Tm = 70.2° C.
[Chemical Formula 9]
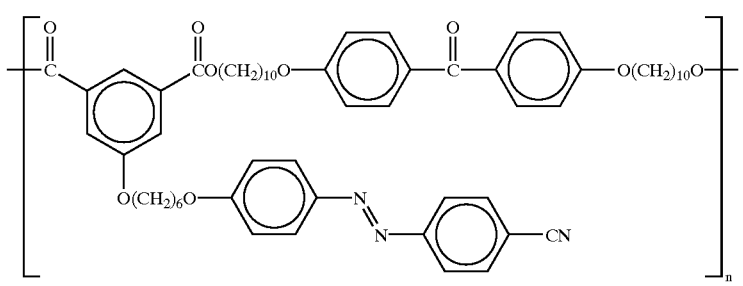
Tg = 33.1° C., Tm = 68.5° C.
[Chemical Formula 10]
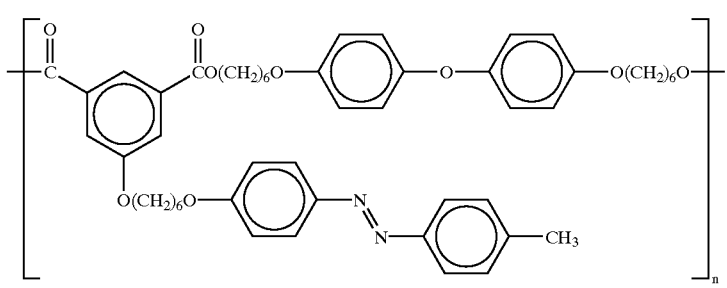
[Chemical Formula 11]

For each of the polymers shown above, an effect of enhancing the birefringence as shown by the following concrete experiment was confirmed.

An explanation will be made to the photoisomerizable molecule used in this invention. The photoisomerizable group can include dye molecules containing azo group such as methyl red, methyl orange, disperse red 1, disperse red 13 and disperse orange 3.

Further, the polymer to which the photoisomerizable molecule is added can include, for example, polymethyl methacrylate, polyvinyl alcohol, polyvinyl acetate and polyallylamine.

Further, this invention provides also an optical anisotropic medium having a polymer film provided with the optical anisotropy obtained as described above. The optical anisotropic medium according to this invention is obtained by photoisomerizing a medium formed by disposing, on a transparent substrate such as a glass substrate, a layer including a polymeric film containing a photoisomerizable group in the molecule or a polymeric film containing a photoisomerizable molecule in which the photoisomerizable group or the photoisomerizable molecule has T (thermal) type photochromic property capable of being photoisomerized by thermal back reaction after photoisomerization (hereinafter the layer is sometimes referred to as "light orientation layer"), by using the method as detailed later.

An example of the light orientation medium is to be explained with reference to FIG. 3. FIG. 3A shows a medium in which a light orientation layer 12 is formed on one surface of a transparent substrate 11 and FIG. 3B shows a medium in which a light orientation layer 12 is interposed to a gap formed with two sheets of transparent substrates 11 such as glass substrates. Further, the medium may include only the light orientation layer 12 without using the substrate, for example, as shown in FIG. 3C. In addition, the structure can be modified in accordance with the application use of the light orientation medium.

The method of providing the polymeric film with the optical anisotropy according to this invention is applied not only to a purpose of directly utilizing the optical anisotropy (birefringence, dichroism) of the obtained polymeric film but also for a purpose of utilizing the orientation property of the polymer itself enhanced by the method of providing the polymeric film with the optical anisotropy according to this invention as described specifically above, for example, for formation of the liquid-crystal-aligning film.

According to this invention, when the photoisomerizable group or the photoisomerizable molecule undergoes thermal isomerization, since temperature control is conducted to the polymeric film containing the same for enhancing the orientation of the photoisomerizable group or the photoisomerizable molecule induced by the thermal back reaction, the thermal isomerization and orientation from the cis-form to the trans-form can be induced effectively, and the effect of enhancing the birefringence after shutting off the polarized light can be improved remarkably. In addition, orientation of the main chain portion is also induced to contribute to the increase of the birefringence by interaction exerting between the rigid segments of the side chain portion and/or the main chain portion. This can not only shorten the time for orientation but also provide high birefringence which could not be obtained in the prior art.

Further, the isomerization reaction characteristic to this invention does not require high temperature for inducing the motion. Accordingly, a higher resolving power than in the prior art can be provided in enhancing the optional orientation state. In the embodiment to be described later, the effect of enhancing the birefringence shows at least 1 $\mu$m of the resolving power. On the other hand, in the existent light orientation method, while heat treatment is applied in view of the requirement for increasing the mobility of segments as the driving source for the orientation, increase of the mobility of the segments results in lowering of the resolving power for increasing the optional orientation distribution.

Accordingly, it is possible to manufacture liquid-crystal-aligning film and wave plate (optical phase retarder) at high quality by utilizing the photoinduced anisotropy. Further, an optical element having high non-linearity can also be manufactured by efficient arrangement of the non-linear chromophore such as an azo dye.

Further, efficient recording of an optical axis of the photoinduced birefringence enables to attain a large capacity optical memory for hologram or bit recording. As described above, the application use of utilizing this invention covers optical elements in general.

Then, a method of providing the polymeric film with the optical anisotropy according to this invention is to be explained more specifically with reference to experimental examples.

1. At first, an explanation will be made to the preparation of polyesters having cyanoazobenzene which is a photoisomerizable group in the side chain used in the following experiments (hereinafter sometimes referred to as "light orientation layer material") and manufacture of a light orientation medium using the polyester. An example of preparing the polyester shown by the Chemical Formula 5 described above is shown here and the polyester shown by the structural formula described above can be produced in the same manner by the method in accordance with the following preparation method.

The material for the light orientation layer used hereinafter are reported in "Synthesis and properties of polyesters having cyanoazobenzene units in the side chain" by M. Sato, et al in Macromol. Rapid. Commun. 15, 21–29 (1994). The present inventor has synthesized this polymer by the method described in the paper shown above. The synthesis procedures for practicing the invention are to be shown below.

Synthesis of 4-hydroxy-4'-cyanoazobenzene

While stirring 2 mol (236.3 g) of 4-aminobenzonitrile, 600 ml of 12N HCl and 600 ml of purified water in an ice bath, an aqueous solution of $NaNO_2$ ($NaNO_2$ 150 g, in 750 ml of purified water) was dropped (Step 1). 2 mol (191.8 g) of phenol and 2 mol (112.3 g) of KOH were rapidly dissolved in about 2 liter of purified water, to which the product in Step 1 was dropped. After filtration under suction, the product was washed with purified water and then dried under a reduced pressure. The product was recrystallized in methanol to obtain 1.3 mol of 4-hydroxy-4'-cyanoazobenzene (292.3 g; yield 65.5%).

Synthesis of 4-(6-bromohexyloxy)-4'-cyanoazobenzene 0.2 mol (44.6 g) of 4-hydroxy-4'-cyanoazobenzene, 2 mol (488.1 g) of 1,6-dibromohexane, 1.45 mol (220.4 g) of $K_2CO_3$ and 800 ml of acetone were charged in a 2-liter three-necked flask and reacted under reflux for 20 hours by using a water bath. After cooling to a room temperature, by-products and excess $K_2CO_3$ were removed by filtration. After concentrating to about 1/2 by using a rotary evaporator, the product was left in a refrigeration box to be crystallized. After filtration under suction, crystals were washed with n-hexane and dried under a reduced pressure (0.117 mol (45.3 g, yield; 58.6%)). Further, they were recrystallized in ethanol to obtain 0.094 mol of 4-(6-bromohexyloxy)-4'-cyanoazobenzene (36.3 g, yield: 47.0%)

Synthesis of diethyl 5-hydroxyisophthalate 1 mol (182.4 g) of 5-hydroxyisophthalic acid, 1500 ml of ethanol and 10 ml of concentrated sulfuric acid were charged in a 2-liter three-necked flask and reacted under reflux for 24 hours by using a water bath. After concentrating by using a rotary evaporator and poured into an aqueous solution of $NaHCO_3$, the product was filtered and dried under a reduced pressure to obtain 0.096 mol of diethyl 5-hydroxyisophthalate (228.8 g, yield: 96.0%). Further after recrystallization in ethanol, they were heated (50 to 60° C.) and dried under a reduced pressure.

Synthesis of side chain monomer: Ethyl 5-(4-cyanobenzeneazo-henoxyhexyloxy) isophthalate 0.08 mol (30.9 g) of 4-(6-bromohexyloxy)-4'-cuanoazobenzene, 0.08 mol of diethyl 5-hydroxyisophthalate, 0.12 mol (16.58 g) of $K_2CO_3$ and 400 ml of acetone were charged in a 1-liter three-necked flask and reacted under reflux for 24 hours by using water bath. After allowed them to cool, they were poured into about 4 liters of purified water, and precipitates were recovered by filtration and dried under a reduced pressure (0.071 mol (38.8 G, yield: 89.2%)). Subsequently, they were recrystallized in acetone to obtain 0.058 mol of ethyl 5-(4-cyanobenzeneazophenoxyhexyloxy) isophthalate as the side chain monomer (31.4 g, yield: 72.2%). Melting point: 99.0° C., absorption peak: 364.2 m.

The side chain monomer was identified by FTIR spectrum and $^1H$ NMR. The result of FTIR is shown below and the result of $^1H$ NMR analysis spectrum is shown [Chemical Formula 12].

FTIR (KBr): 2947.7 cm$^{-1}$ (CH stretching), 2227.4 cm$^{-1}$ (CN), 1713.4 cm$^{-1}$ (ester C=O), 1599.7 cm$^{-1}$ (C=C), 1580 cm$^{-1}$ (N=N), 1244.8 cm$^{-1}$ (C—O—C).

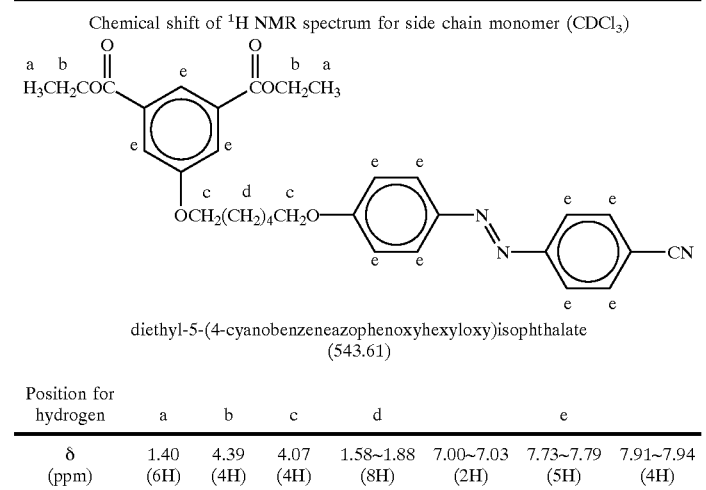

Chemical shift of $^1H$ NMR spectrum for side chain monomer (CDCl$_3$)

diethyl-5-(4-cyanobenzeneazophenoxyhexyloxy)isophthalate
(543.61)

| Position for hydrogen | a | b | c | d | e | e | e |
|---|---|---|---|---|---|---|---|
| δ (ppm) | 1.40 (6H) | 4.39 (4H) | 4.07 (4H) | 1.58~1.88 (8H) | 7.00~7.03 (2H) | 7.73~7.79 (5H) | 7.91~7.94 (4H) |

Synthesis of main chain monomer: Bis(4-hydroxyhexyloxy phenyl)-ether 0.3 mol (60.66 g) of 4,4'-dihycroxydiphenyl ether, 0.66 mol (90.16 g) of 6-chloro-1-hexanol, 0.7 mol (97 g) of $K_2CO_3$ and 250 ml of N,N-dimethylformamide were mixed and reacted by heating at 160° C. for 24 hours by using an oil bath. Subsequently, the product was poured into water containing a small amount of hydrochloric acid and filtered and dried under a reduced pressure to obtain bis(4-hydrohexyloxyphenyl)-ether. Further, it was recrystallized from a water-N,N-dimethylformamide system (substantially quantitatively). Melting point: 119° C.

The main chain monomer was identified by FTIR spectrum and $^1H$ NMR. The result of FTIR is shown below and the result of $^1H$ NMR analysis spectrum is shown in [Chemical Formula 13].

IR (KBr) (JASCO FT/IR-230): 3312.1 cm$^{-1}$ (OH), 2936.1 cm$^{-1}$ (CH stretching), 1505.2 cm$^{-1}$ (aromatic), 1241.9 cm$^{-1}$ (C—O—C)

Chemical shift of $^1$H NMR spectrum for main chain monomer (CDCl$_3$)

```
        e   e         e   e
a  b  c  d              d  c  b  a
HOCH₂(CH₂)₄CH₂O─⟨  ⟩─O─⟨  ⟩─OCH₂(CH₂)₄CH₂OH
        e   e         e   e
       bis(4-hydrohexyloxyphenyl)ether
                 (402.52)
```

| Position for hydrogen | a | b | c | d | e |
|---|---|---|---|---|---|
| δ (ppm) | 1.30 (2H) | 3.67 (4H) | 1.44~1.82 (16H) | 3.93 (4H) | 6.82~6.92 (8H) |

Melt Polycondensation of Polyester Having Azobenzene in the Side Chain 0.01 mol (5.4361 g) of ethyl-5-(4-cyanobenzeneazo-phenoxyhexynoxy)-isophthalate as the side chain monomer, 0.01 mol (4.0253 g) of bis(4-hydrohexyloxyphenyl) ether as the main chain monomer and 0.1 g of anhydrous zinc acetate were charged in a 300-ml three-necked flask and, after nitrogen substitution, reacted by the following steps:

(1) reacted at about 160° C. for 2 hours,
(2) reacted under a reduced pressure of 10 Torr for 20 min,
(3) elevated to a temperature of 180° C. and reduced to a pressure of 2–5 Torr for 30 min,
(4) reacted at 180° C. and 2–5 Torr for 2 hours.

After the reaction, the product was dissolved in chloroform and poured into methanol. The precipitates were recovered by filtration, washed under heating with purified water and methanol and then dried under a reduced pressure to obtain polyester having cyanoazobenzene in the side chain (substantially quantitatively).

FIG. 4 shows a DSC curve for the polymer synthesized by the method described above. The glass transition temperature $T_g$ was 38° C. and the melting point Tm was 65° C. Further, average molecular weight was about 11,900. Accordingly, the average repeating unit No. n=14. According to the polarized microscopic observation, it was found to be a polymer with no presence of liquid crystal phase and having birefringence in a solid state.

Manufacture of a Light Orientation Medium

The polymer synthesized by the method described above was dissolved at a concentration of 0.8 g/ml in chloroform and spin coated on a cleaned glass substrate (1000 rpm, 20 sec). After drying, it was heated to an isotropic phase and quenched. Under the polarized microscopic observation, it was confirmed that the prepared film (light orientation layer) was an isotropic amorphous film. Further, when the film thickness was measured by using a probe type surface roughness gage, it was 1.5 μm.

2. Then, an explanation will be made to the method of photoisomerizing the light orientation layer (hereinafter sometimes referred to as "light orientation method") and an apparatus used for the method (hereinafter the apparatus is sometimes referred to as "light orientation apparatus").

Figure 5:
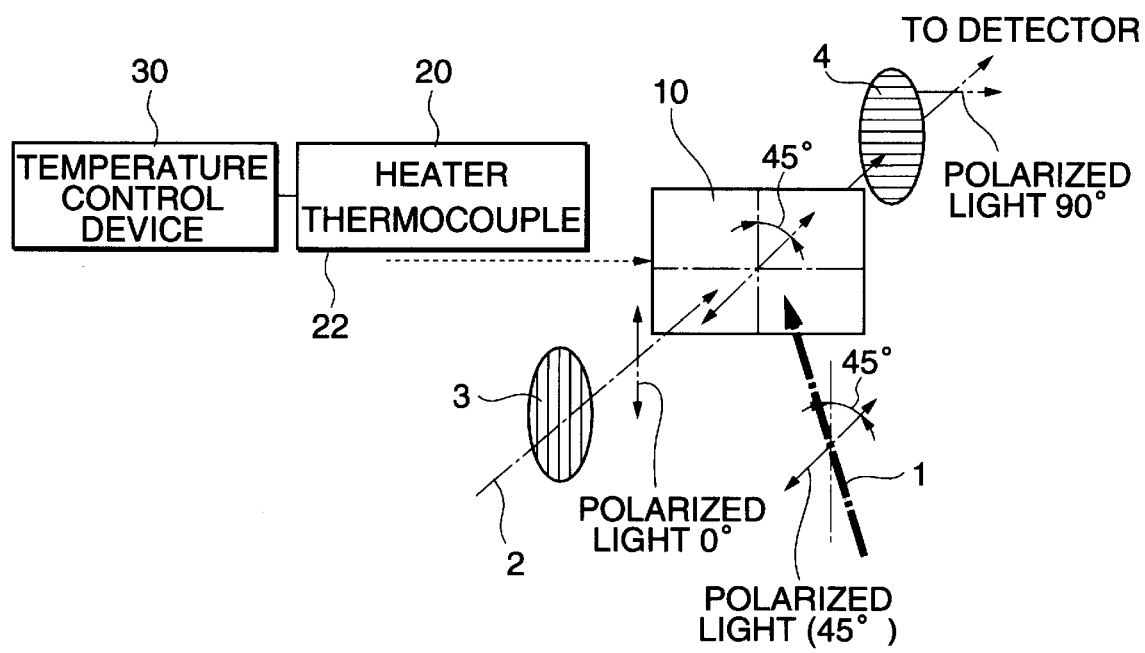
FIG. 5 is a schematic view of an apparatus used in the light orientation method according to this invention.

(1) At first, the light orientation apparatus used will be explained. FIG. 5 shows an outline of an apparatus for inducing optical anisotropy to the light orientation layer and confirming the induced optical anisotropy. In FIG. 5 are shown a light orientation medium 10, a heater 20, a temperature control device 30 for controlling the temperature of the light orientation layer heated by the heater 20 respec-tively. Further, 1 denotes a pump beam for inducing optical anisotropy (birefringence) to the light orientation layer. As the pump beam 1, an oscillated ray at 515 nm from an argon ion laser to which the polyester having cyanoazobenzene in the side chain is sensitive was used. There are also shown a probe beam 2, a polarizer 3 and an analyzer 4 respectively. They were used for examining the optical anisotropy (birefringence) induced by the pump beam. Oscillated rays at 633 nm from a helium neon laser to which the light orientation medium has no sensitivity was used for the probe beam 2.

The light orientation medium 10 was placed in an optical path of the helium neon laser which was put between the polarizer 3 and the analyzer 4. The direction of the polarizer 3 was 0° C. polarization while the direction of the analyzer 4 was 90° C. direction which were vertical to each other. Under the condition, if the light orientation medium 10 is optically isotropic, the polarizing direction of the probe beam 2 does not change and the beam cannot pass the analyzer 4.

The polarizing direction of the pump beam 1 was set to 45° C. just intermediate between the polarizer 3 and the analyzer 4 and irradiated to the light orientation medium 10 to induce birefringence. Polarized beam of the probe beam 2 was rotated by the induced birefringence of the light orientation medium and passed through the analyzer 4. The optical power I passing the analyzer 4 is represented by the following equation 2. Δn can be calculated by using the equation.

$$I = I_0 \sin^2\left(\frac{\pi \Delta n d}{\lambda}\right)$$

In the equation, $I_0$ represents the intensity of the probe beam before passing the light orientation medium, I represents the intensity of light after passing the analyzer 4, λ shows wavelength of probe beam and d shows the thickness of the light orientation layer.

The photoinduced birefringence of the polyester film having cyanoazobenzene in the side chain evaluated by use of the similar method as described above is reported, for example, in "Holographic recording in polyesters having cyanoazobenzene units in the side chain" by Nakagawa, et al, Proc. SPIE 2778, 571–572 (1996), "Photo-induced isomeric recording of polyesters having cyanoazobenzene in the side chain" by Sayu Yamada, et al, pretext for (the 58th Autumn Meeting, 952 (1997)); the Japan Society of Applied Physics. According to them, it is shown that birefringence induced by the pump beam is increased with time and saturated and increases slightly after shutting off the pump beam but kept at a substantially equal value.

The material showing the similar behavior after shutting off the pump beam are reported, for example, by A. Natansohn, et al in "Azo polymers for reversible optical storage. 4. Cooperative motion of rigid groups in semicrystalline polymers", Macromolecules 27, 2580–2585 (1994). The material is a semicrystalline polymer having an aromatic hydrocarbon in the main chain and the birefringence is slightly increased and maintained after shutting off the pump beam. A. Natansohn, et al take the effect of heat by the irradiation of the pump beam to the phenomenon and considers that it is due to effect of semicrystalline property relaxed from the state of glass.

(2) Temperature Control for Light Orientation Layer

Using the apparatus shown in FIG. 5, two successive processes of applying a polarized to the light orientation layer and then shutting off the polarized light and leaving the same as it was were applied in which the temperature of the light orientation layer was controlled, and the optical anisotropy obtained at each of the temperatures was examined. In this example, temperature was controlled in both of the polarized light irradiation step and the step of shutting off the polarized light and leaving the same as it is.

Using the light orientation medium manufactured in (1) above, the temperature of the medium was changed from 25° C. at room temperature to 47° C. by using the temperature control device 30, and the birefringence induced at each temperature was measured. A heating device for use in microscope having a heater and a thermo-couple capable of keeping a setting temperature by a temperature control device was used for the temperature control (TH-1500SM, manufactured by Linkam Co.). The intensity of the pump beam was set to 1 W/cm$^2$ in order to decrease the change of temperature by the irradiation of light (even if the temperature of the medium was increased by the irradiation of light, it is amended to a set temperature by the temperature control device 30).

The accuracy of the temperature control was ±1° C. Further, the polarized light irradiation region was 1 mmϕ and the irradiation time was 1800 sec.

The birefringence Δn was determined based on the equation 2 and from the intensity $I_0$ of the probe beam, the light intensity I passing through the analyzer 4, λ and d, in which λ=633 nm, and d=1.5 μm. The results are shown in FIG. 6.

Figure 6:
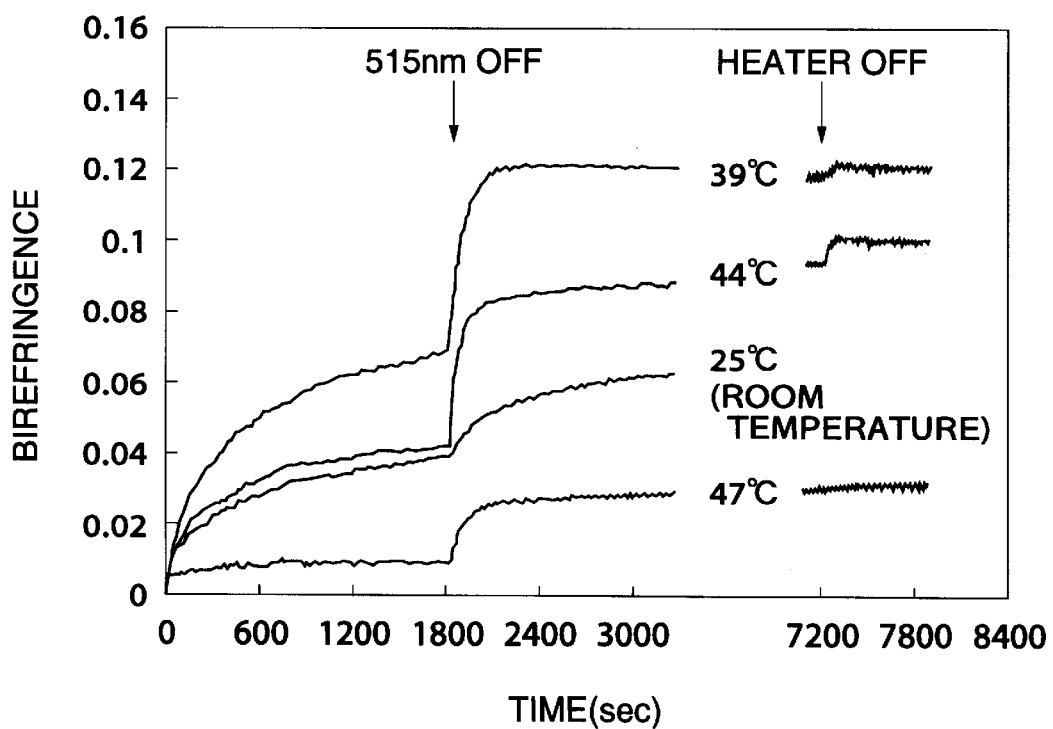
FIG. 6 is a graph showing the change with time of birefringence when the temperature for the light orientation layer is changed variously in the light orientation method according to this invention.

FIG. 6 shows a result of the experiment when the temperature of the light orientation layer was changed as 25° C., 39° C., 24° C. and 47° C. At each temperature, birefringence was induced by the irradiation of the pump beam and developed with time. The birefringence took values different depending on the temperature of the medium. More interestingly, it was found that the birefringence increased greatly after shutting off the pump beam. The increasing effect was also dependent on the medium temperature. It was found that when the heater 20 was turned off and the medium was allowed to cool till the room temperature (7200 sec), the birefringence was increased slightly or maintained at an equal value although the behavior differed depending on the medium temperature.

Figure 7:
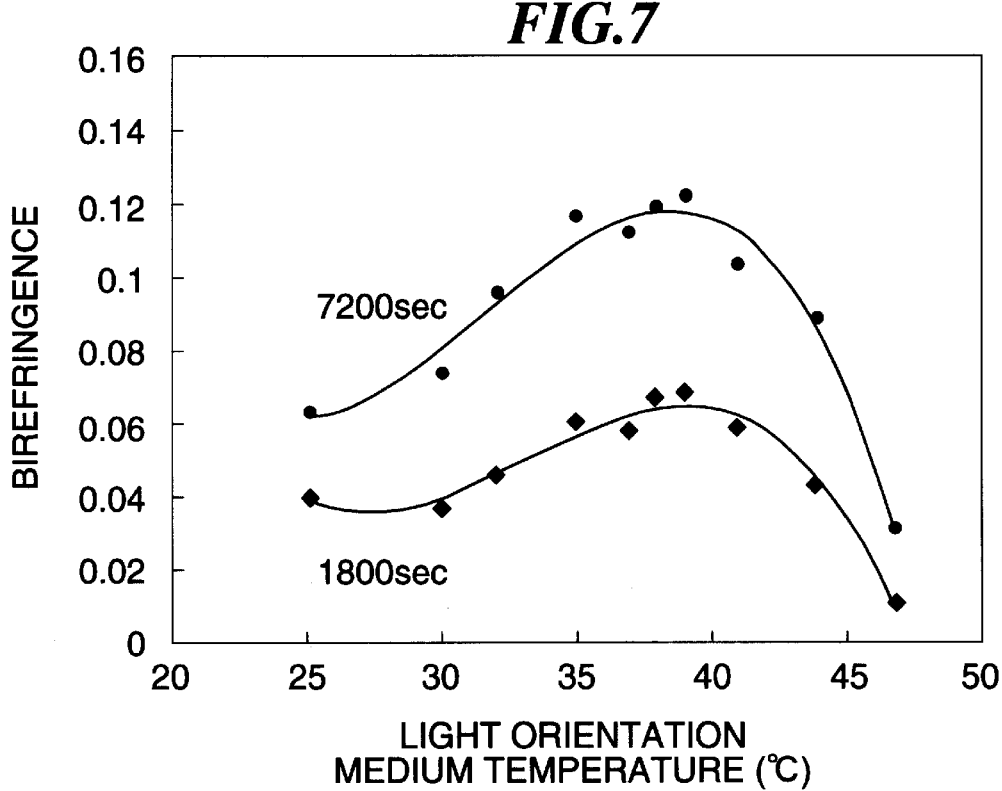
FIG. 7 is a graph for explaining the effect of the temperature of the light orientation layer in the light orientation method according to this invention.

In FIG. 7, birefringence induced in the step of irradiating the polarized light (polarized irradiation time: 1800 sec) and birefringence after the step of shutting off the polarized light and leaving the medium as it was (time: 7200 sec) were plotted relative to the temperature medium. It can be seen that both of the birefringence induced in the step of irradiating the polarized light and the birefringence induced in the step of shutting off the polarized light and leaving the medium as it was (difference between both curves in FIG. 7) was at the maximum near the glass transition temperature ($T_g$=38° C.) of the polymer. From the result, the control temperature in each of the steps was suitably at about $T_g$±7° C. for the material of the light orientation layer.

From the foregoing results, it has been found that high refractive index could be induced and enhancement for the orientation also occurred even after shutting off the pump beam to obtain high birefringence. When the temperature for the optical orientation medium was controlled to about the glass transition temperature $T_g$ thereof. It was reported that the polyester film having cyanoazobenzene in the side chain (refer to Chemical Formula 5) has the photoinduced birefringence of about 0.04 (K. Nakagawa, et al, "Holographic recording in polyesters having cyanoazobenzene units in the side chain", Proc. SPIE 2778, 571–572 (1996)).

When the light orientation apparatus and the light orientation method shown above are used, the induced maximum birefringence exceeds 0.12 which is about three times as high as the prior art and much higher orientation can be attained compared with the prior art.

(3) Polarized Light Irradiation Time and Optical Anisotropy

Figure 8:
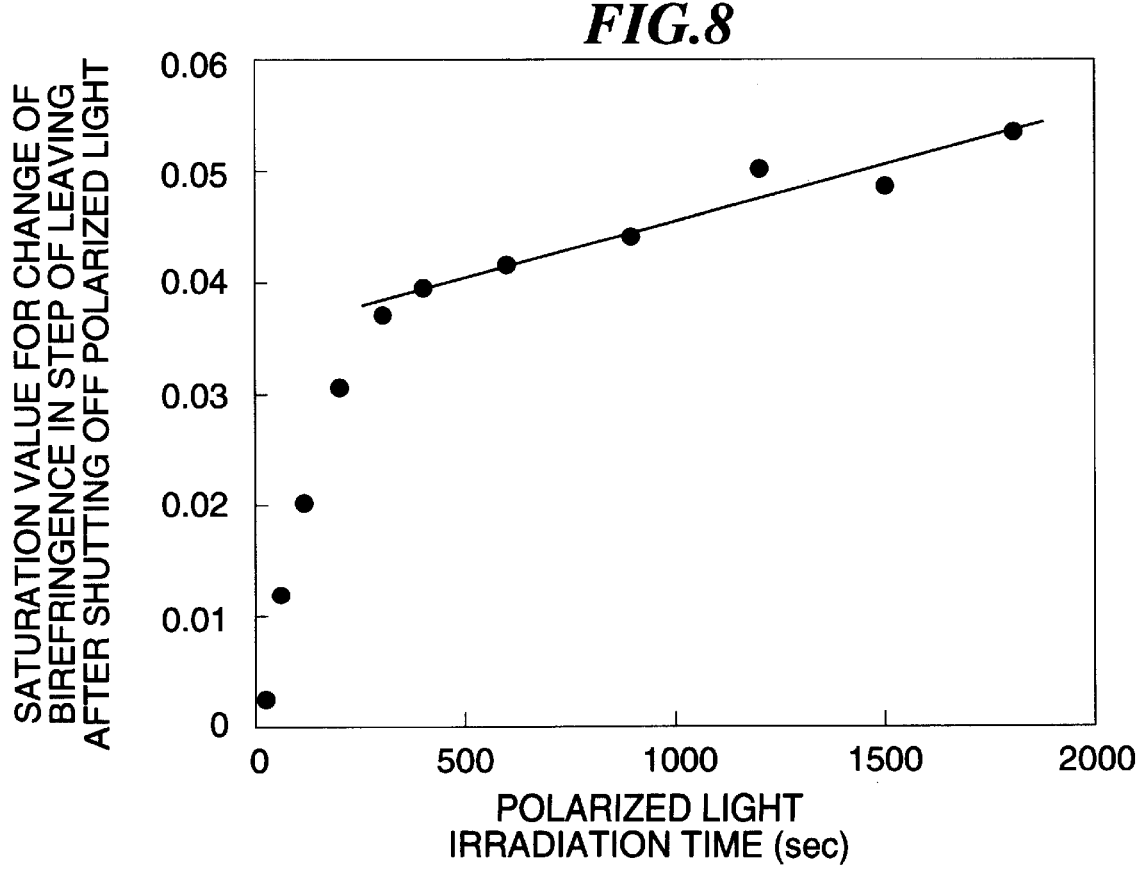
FIG. 8 is a graph for explaining the change of birefringence in a step of shutting off a polarized light and leaving the same as it is in a case of changing the irradiation time of the polarized light in the light orientation method according to this invention.
Figure 9:
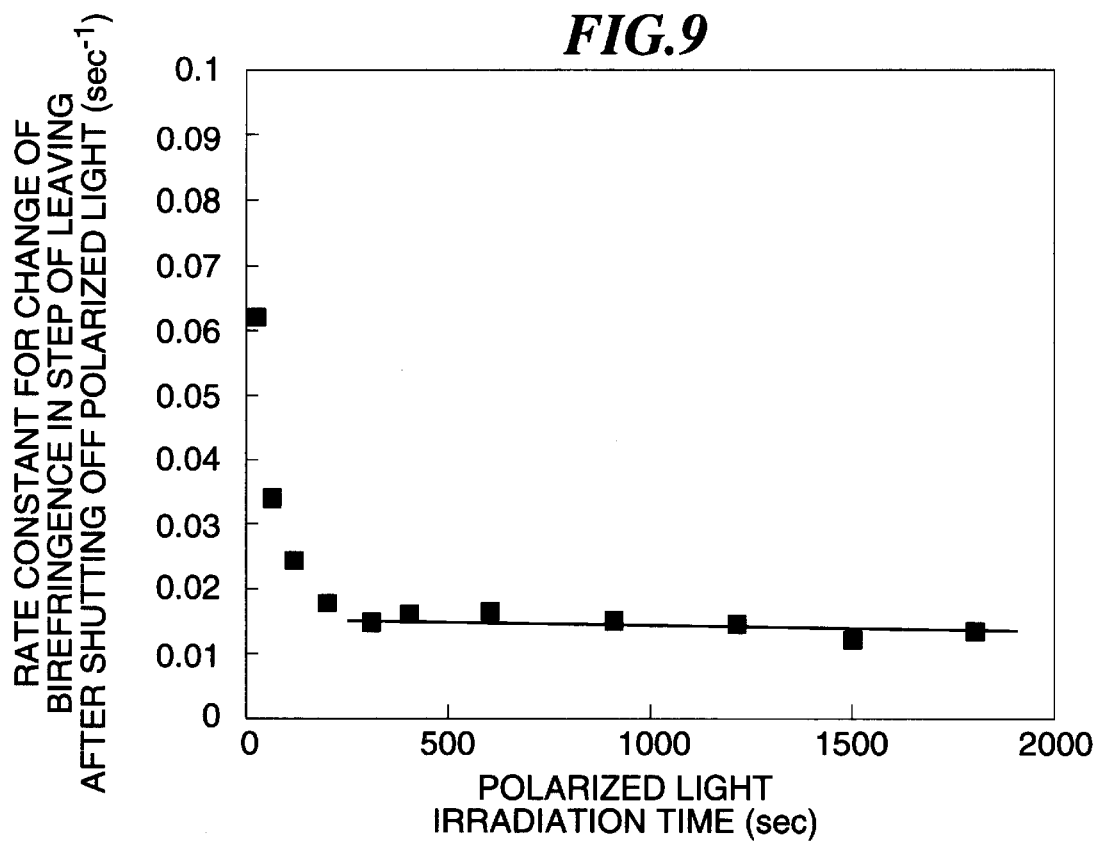
FIG. 9 is a graph expressing the result of FIG. 8 as a rate constant in the change of the birefringence.

Then, the effect of the polarized light irradiation time to the effect of increasing the birefringence after shutting off the polarized light is shown. In FIG. 8 the change of refractive index in the step of shutting off the polarized light and leaving the medium as it was plotted while controlling the medium temperature to 39° C. relative to the irradiation time of the polarized light. FIG. 9 shows the rate constant for the change of the birefringence shown in FIG. 8 (reciprocal to the relaxation time). Although the effect of the polarized light irradiation is no more present after shutting off the polarized light, there is a difference in the effect of increasing the birefringence apparently at the boundary of the irradiation time of about 300 sec in view of FIG. 8 and FIG. 9. At about 300 sec or less, change of the birefringence greatly depends on the polarized light irradiation time but change due to the polarized light irradiation time is decreased at over 300 sec, and the saturation speed was substantially at a constant value. That is, the effect of the phenomenon as the driving source for the effect of increasing the birefringence changes at the irradiation time.

For considering the effect of the polarized light irradiation time relative to the effect of enhancing the birefringence after shutting off the polarized light, change of the birefringence in the step of irradiating the polarized light is shown. D. Brown et al reported in Macromolecules 28, 6116 (1995) that a series of polymer film having azobenzene side chain enables fitting at high accuracy by biexponential equation shown in equation 1 relative to the change of the exposure time of the photoinduced birefringence.

$$\Delta n = A \cdot \{1 - \exp(-t/\tau_a)\} + B \cdot \{1 - \exp(-t/\tau_b)\} \ (\tau_a \leq \tau_b) \quad \text{Equation 1}$$

in which Δn represents birefringence at time τ, $\tau_a$, $\tau_b$ ($\tau_a < \tau_b$) each represents the time constant for components a and b, A and B each represents the birefringence for the components a and b (A+B: maximum induced birefringence (saturated birefringence)).

The change of the photoinduced birefringence in the step of irradiating the polarized light according to this invention can also be fitted by using the equation 1 (Jiro Minabe, et al, "Hologram recording and reconstruction of polarized light with azo polymer (IV)—Effect of light intensity on photoinduced birefringence—" pretext for (the 46th Spring Meeting, 1209 (1999); the Japan Society of Applied Physics and Related Societies.

Figure 10:
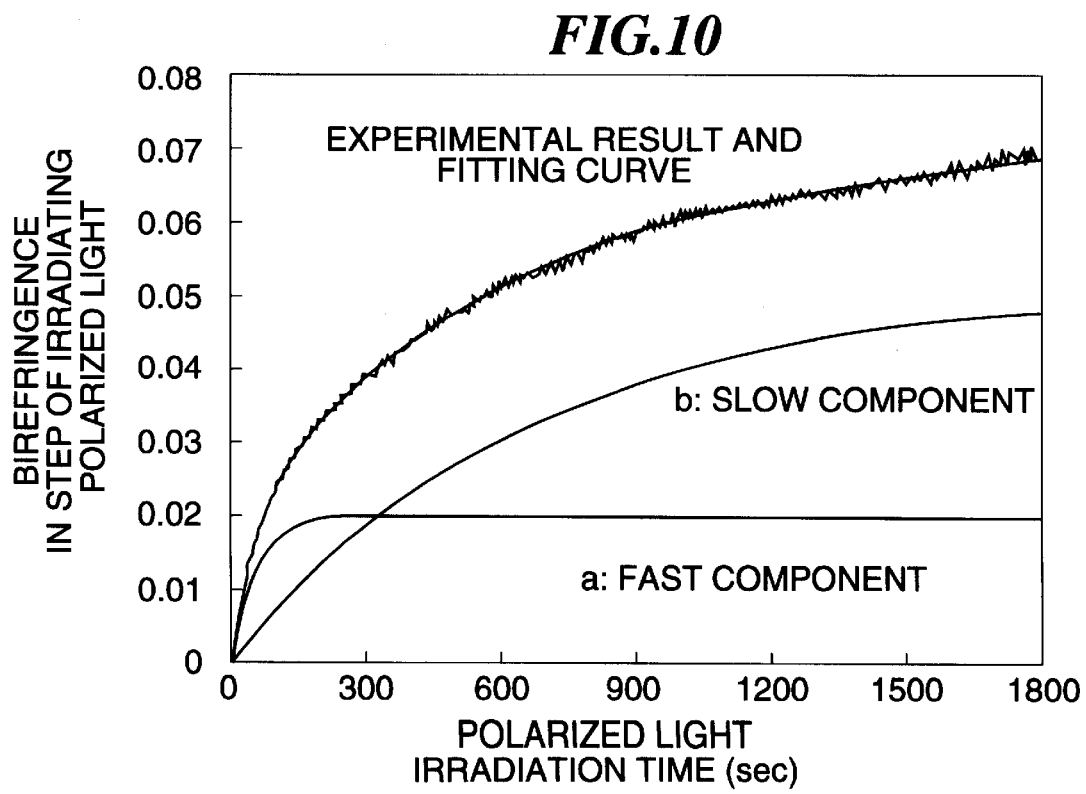
FIG. 10 is a graph by fitting the change of birefringence in the course of irradiation of a polarized light by using equation 1.

FIG. 10 shows the change of the photoinduced birefringence in the step of irradiating polarized light when the medium temperature was controlled to 39° C., a curve fitted by equation 1 using least square method and a fast component (component a in the equation 1) and a slow component (component b in equation 1). It can be seen from comparison between FIG. 8 and FIG. 9 that the time in which the fast component a is saturated sufficiently corresponds to the boundary time at which difference is caused to the effect of enhancing the birefringence after shutting off the polarized light.

From the foregoing results, it has been found that the effect of enhancing the birefringence after shutting off the polarized light depending on the polarized light irradiation time. The polarization irradiation time is preferably more than the time constant $\tau_a$ for the fast component a upon fitting the change of the birefringence in the step irradiating the polarized light by the equation 1. More preferably, the effect of enhancing the birefringence can be exerted more effectively, and the variation for the enhanced birefringence can also be suppressed by making it to 6 $\tau_a$ (since $\tau_a$=51.73 sec, 300 sec≈6 $\tau_a$) or more, which is the time at which the fast component saturates sufficiently.

The mechanism for the effect of enhancing the birefringence after shutting off the irradiation of the polarized light is to be shown.

Figure 2:
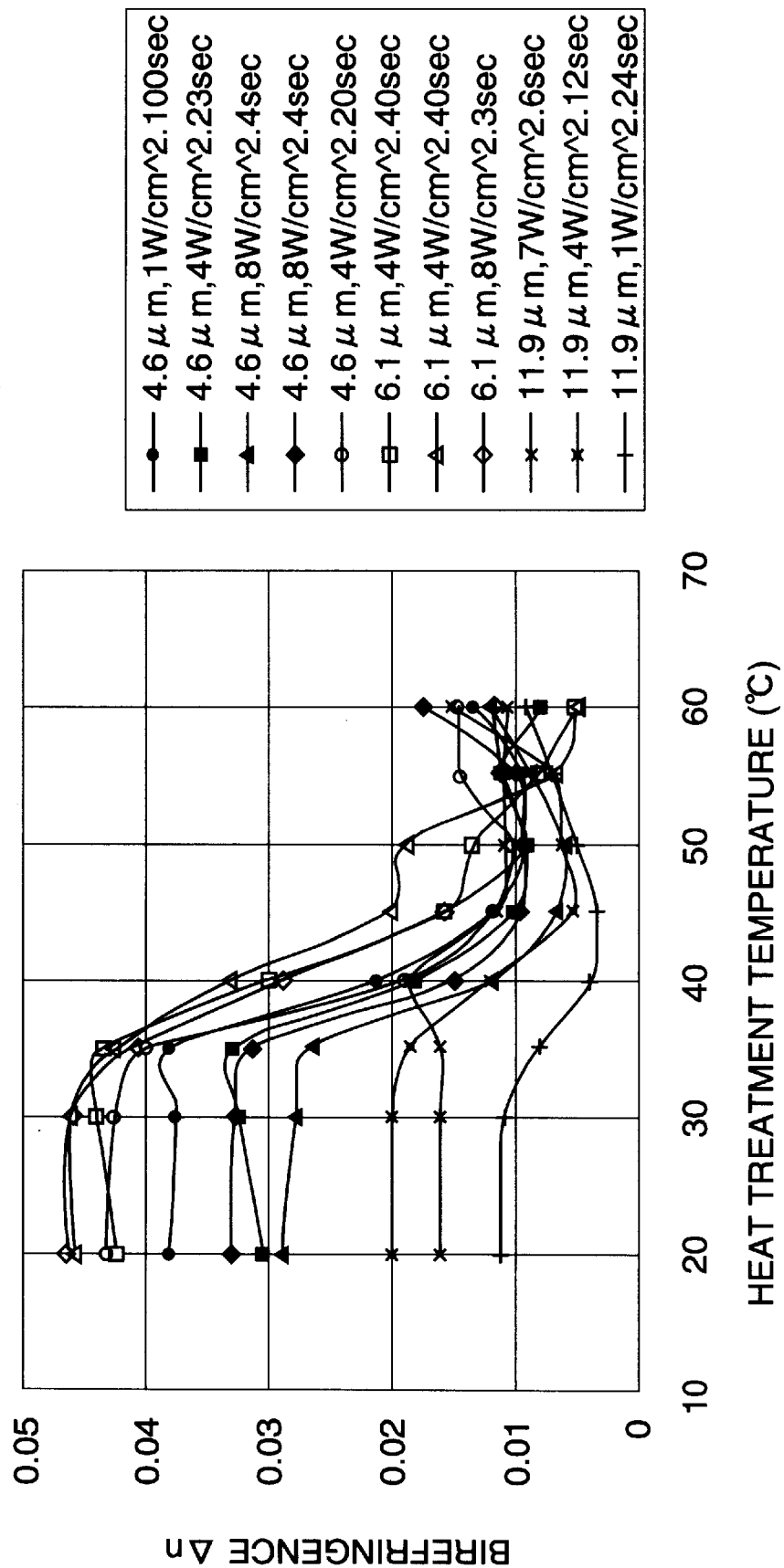
FIG. 2 is a graph showing the change of birefringence when a heat treatment effect is provided by the existent method after shutting off the polarized light.

At first, the birefringence induced and maintained by the irradiation of a polarized light does not increase but rather decrease only by the heat treatment in the prior art (FIG. 2). Accordingly, the effect of enhancing the birefringence cannot be obtained merely by the interaction between the rigid segments of the side chains and/or the main chains when the mobility of the polymer is changed by the heat treatment.

Secondly, even in a case of controlling lower temperature than the glass transition temperature $T_g$ within ±1° C., an increased effect of enhancing the birefringence of increasing it by about twice was observed. Accordingly, it is not considered as the effect of semi-crystalline property relaxed from the glass state. It is rather considered that the birefringence increasing phenomenon when the heater shown in FIG. 6 is turned off (7200 sec) is caused by the effect of crystallization including decrease in the thermal fluctuation by the lowering temperature.

Thirdly, the effect enhancing the birefringence after shutting the polarized light undergoes the effect of the polarized light irradiation time although it is after the shutting. Particularly, sufficient saturation of the fast component a in the equation 1 is related to the effect of within the effective effect of enhancing the birefringence. It is considered that the fast component a in the equation 1 is attributable to the quantum efficiency in the trans-cis-trans isomerization and the local mobility of azobenzene, and the local mobility is attributable to the size and the free volume of the azobenzene moiety and the bonding strength between the azobenzene moiety and the main chain (D. Brown, et al, "Macromolecules" 28, 6116 (1995)). Accordingly, the effect of enhancing the birefringence is closely related to the motion of the side chain having the photoisomerizable group such as azobenzene.

In view of the considerations described above, it is considered that the main driving source for the effect of enhancing the birefringence in the step of shutting off the polarized light and leaving. the same as it is is the isomerization reaction returning from the cis-form to the trans-form by the thermal reaction and interaction exerting between the the rigid segments in the side chains and/or the main chains. In the step of applying the polarized light, selective isomerization reaction occurs by the irradiation of the polarized light to an amorphous film at the initial stage in which the trans-form is predominant, and change of orientation occurs in the course of the trans-cis-trans isomerization cycles. When the polarized light is shut off, the cis-form increased by the irradiation of the polarized light is isomerized into the trans-form by the thermal reaction, in which it undergoes a strong effect mainly of the orientation state of the side chain induced so far and, as a result, it exerts in the direction of increasing the orientation. Since the effect increases in the vicinity of $T_g$ of the polymer, the effect of the thermal isomerization reaction from the cis-form to the trans-form also induces the change of orientation in the main chain. It is considered that abrupt change for the polarized light irradiation time less than about 300 sec in FIG. 8 is mainly attributable to the difference of the orientation property of the side chain, while the moderate change in the irradiation time of 300 sec or more is attributable to the effect of the difference of the orientation property just before the shutting off the polarized light including the main chain.

As described previously, there was scarce change or only increase of several % or less after shutting off the polarized light in the existent light orientation by the irradiation of the polarized light with no temperature control. It is considered that the thermal isomerization reaction from the cis-form to the trans-form explained in this invention is caused by that the mobility of the polymer is rapidly attenuated by the lowering the medium temperature by the shutting of the polarized light and does not effectively lead to the effect of enhancing the birefringence. For effectively exerting the effect of enhancing the birefringence after shutting off the polarized light, it is effective to control the temperature of the polymeric film containing the photoisomerizable group or molecule in the step of shutting off the polarized light and leaving the same as it is to a temperature equal with or higher than that in the step of irradiating the polarized light.

(4) Temperature Control for the Light Orientation Layer by the Irradiation of Polarized Light An explanation will be made to a method of controlling temperature of the polymeric film by the irradiation or the polarized light by controlling the irradiation intensity of the irradiation power of the polarized light. Accordingly, the pump beam 1 exerts so as to photoisomerize the azo group and, in addition, control the medium temperature. As the apparatus used for this purpose, an optical system of the light orientation device shown in FIG. 5 can be used. Oscillated beams at 515 nm of an argon ion laser to which the medium is sensitive can induce trans-cis isomerization of azobenzene and rise the temperature of the medium. The temperature of the medium can be controlled by changing the intensity or the power of the pump beam.

When the temperature is controlled by the irradiation intensity or the power of the polarized light, it should be noted, with regard to the medium temperature, for the structure and the thickness of the light orientation medium and the heat accumulating characteristic of the medium. In view of the above, the light orientation medium used in this experiment was prepared by manufacturing a parallel flat cell using 7059 glass of 1.1 mm thickness made of Corning, Inc. and injecting the polyester prepared in (1) above (refer to "Chemical Formula 5") into 11 μm gap.

Further, for the value of the birefringence (FIG. 11, FIG. 12), change of birefringence upon irradiation of the polarized light was fitted with the equation 1, and the saturation value was adopted. The saturation value of the fitting curve in FIG. 11 and FIG. 12 was used in order to compare on a common time axis in the saturation phenomenon.

Figure 11:
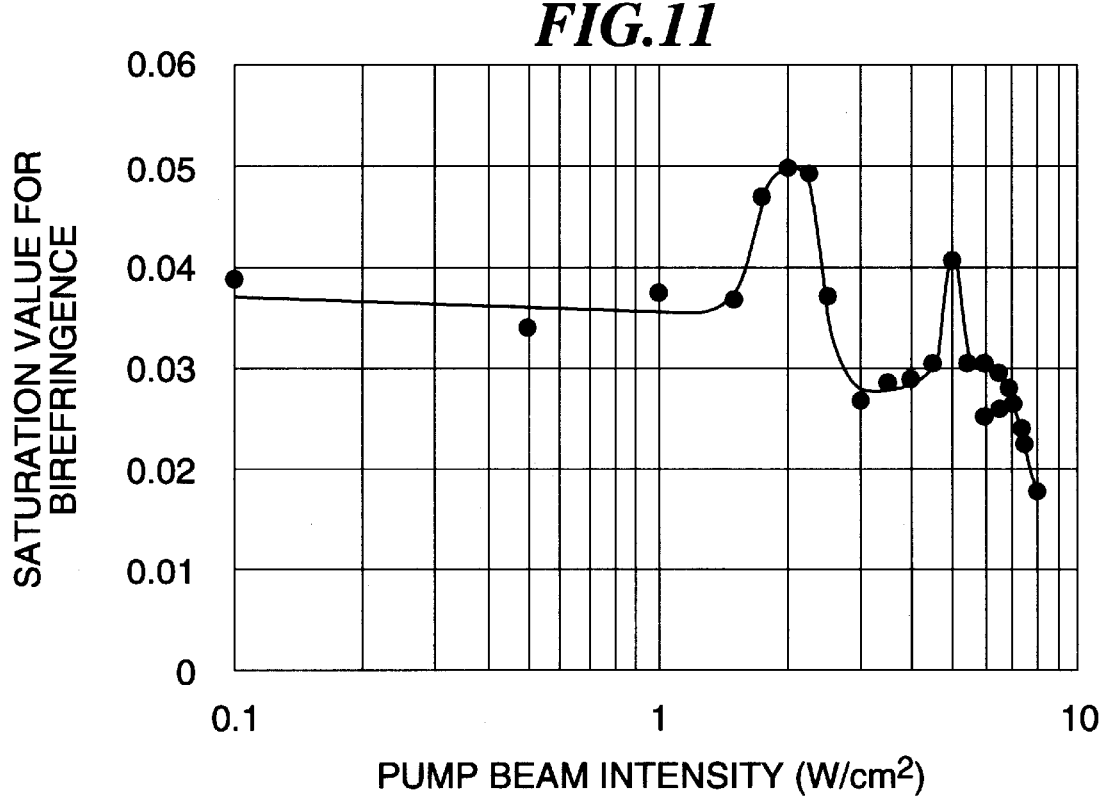
FIG. 11 is a view showing a saturation value of birefringence in a case of controlling the temperature by the irradiation of a pump beam in the light orientation method according to this invention.

FIG. 11 shows the result of measuring the birefringence by using the light orientation medium and the orientation apparatus described above, setting the irradiation region of the polarized light in the light orientation medium constant as 1 mmφ and varying the light intensity of the pump beam 1. It has been found that high birefringence is induced when the intensity of the pump beam is at 2 W/cm$^2$ and 5 W/cm$^2$.

Figure 12:
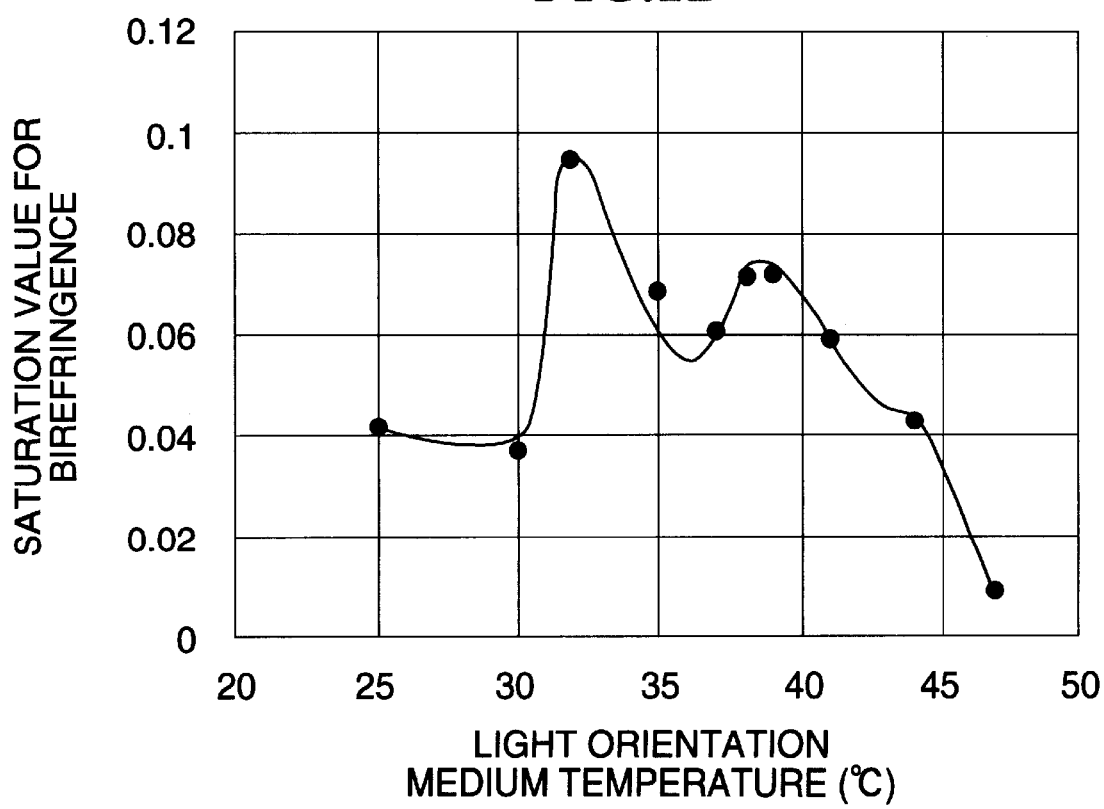
FIG. 12 is a graph showing a saturation value of birefringence shown in FIG. 7 (step of applying a polarized light) by using equation 1.

FIG. 12 is a graph of fitting the change of the birefringence using the equation 1 in the step of irradiating the polarized light shown in FIG. 7 and showing the saturation value thereof.

The region at 1 W/cm$^2$ or more in FIG. 11 is similar to FIG. 12 in a qualitative point of view. Since the medium temperature rises to 32° C. and 38° C. at the intensity of pump beam of 2 W/cm$^2$ and 5 W/cm$^2$ in FIG. 11, it is considered that the saturation value of the birefringence reached a maximum value.

Accordingly, the medium temperature in the step of applying the polarized light can be controlled by adjusting the intensity or the power of the polarized light in accordance with the heat accumulating and dissipating characteristic of the light orientation medium.

Since the growing rate of the photoinduced birefringence increases in accordance with the increase of the light intensity, the time of applying the polarized light can be shortened by controlling the temperature using this system. The temperature control in the step of shutting off the polarized light and leaving the same as it is can be attained by the temperature control device having a heater. As a more simple method, it is also effective to dispose a heat accumulation layer to the light orientation medium such that the medium temperature is maintained for a period sufficiently longer than the relaxation time for the effect of enhancing the refractive index by the cis-trans isomerization reaction.

In FIGS. 11 and 12, a maximum value not found in FIG. 7 appears on a lower temperature (lower intensity) side than the glass transition temperature ($T_g$=38° C.). The value does not appear in FIG. 7 because this is the contribution by the component with slow relaxation time. It is considered that the medium temperature at 32° C. showing the maximum value corresponds to the secondary glass transition temperature ($T_{gg}$) caused by local mobility of the polymer.

Figure 13:
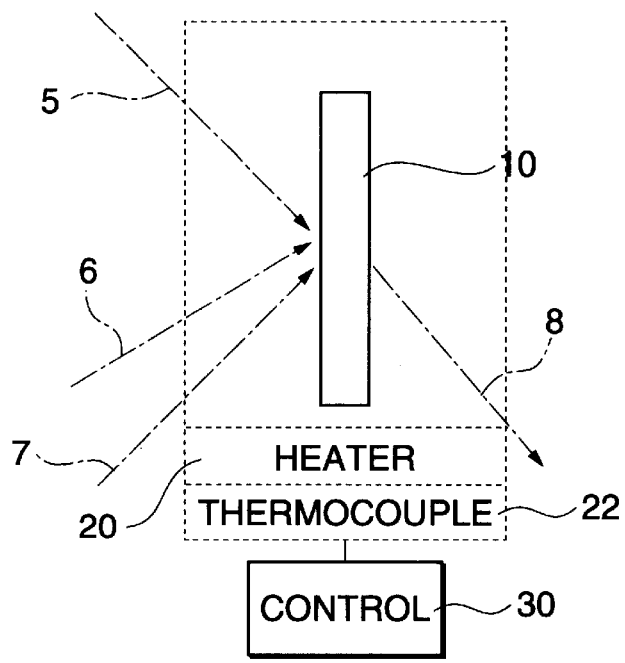
FIG. 13 is a conceptional view for manufacturing a hologram by using the light orientation method according to this invention.

(5) Preparation of Hologram Using the Light Orientation Method According to the Invention FIG. 13 shows an example of a hologram preparing apparatus using the light orientation method according to this invention. A heater 20 and a temperature control device 30 were attached to a light orientation medium 10. The light orientation medium used is a spin coat film of 1.5 μm in thickness made of polyester formed on the glass substrate as described in (1) above. A coherent light emitted from a light source of generating a beam at 515 nm of an argon ion laser was divided into an object light 5 and a reference light 6, which were applied simultaneously to the light orientation medium 10, thereby conducting hologram recording. The light intensity of the two optical waves were respectively set to 500 mW/cm$^2$ such that the medium temperature did not change by the irradiation of the light, and the irradiation time was set to 900 sec. For measuring the diffraction efficiency on the real time, a read leading light 7 (633 nm) from the helium-neon laser was entered to the light recording medium 10 so as to satisfy the phase matching condition (at an incident angle of about Bragg's condition) to measure the power of a diffracted light 8. The diffraction efficiency was determined as a ratio of the diffracted light power to the read light power.

Figure 14:
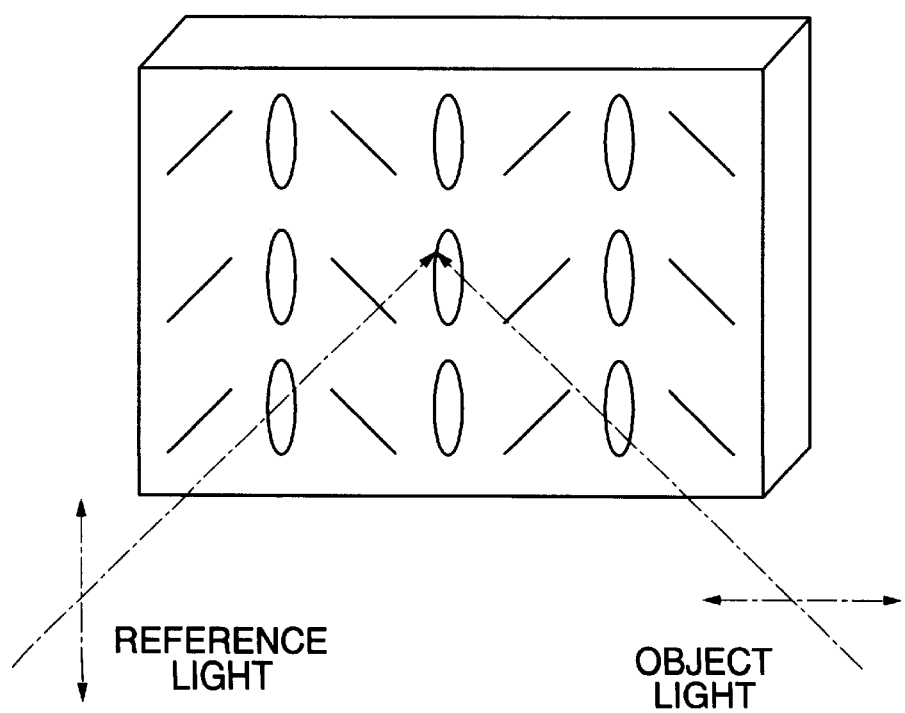
FIG. 14 is a view showing a polarization configuration of two beams forming hologram.

FIG. 14 shows the polarization configuration of two optical waves forming the hologram. In this case, the polarizing directions of the object light and the reference light were arranged so as to be orthogonal to each other. While the intensity of light in the medium is constant, a polarization distribution in which linearly polarized light and elliptically polarized light are formed periodically is caused by two optical waves as shown in FIG. 14. Since the material for the light orientation layer shown in this invention has a polarization sensitivity, the birefringence (and dichroism) can be induced and maintained in accordance with the polarized light distribution formed with two optical waves. In this configuration, the crossing angle between the two optical waves was set to 30°. When the pitch of the polarized light distribution was calculated considering the refractive index of the polymer as the material for the light orientation layer, it was about 1 μm.

Figure 15:
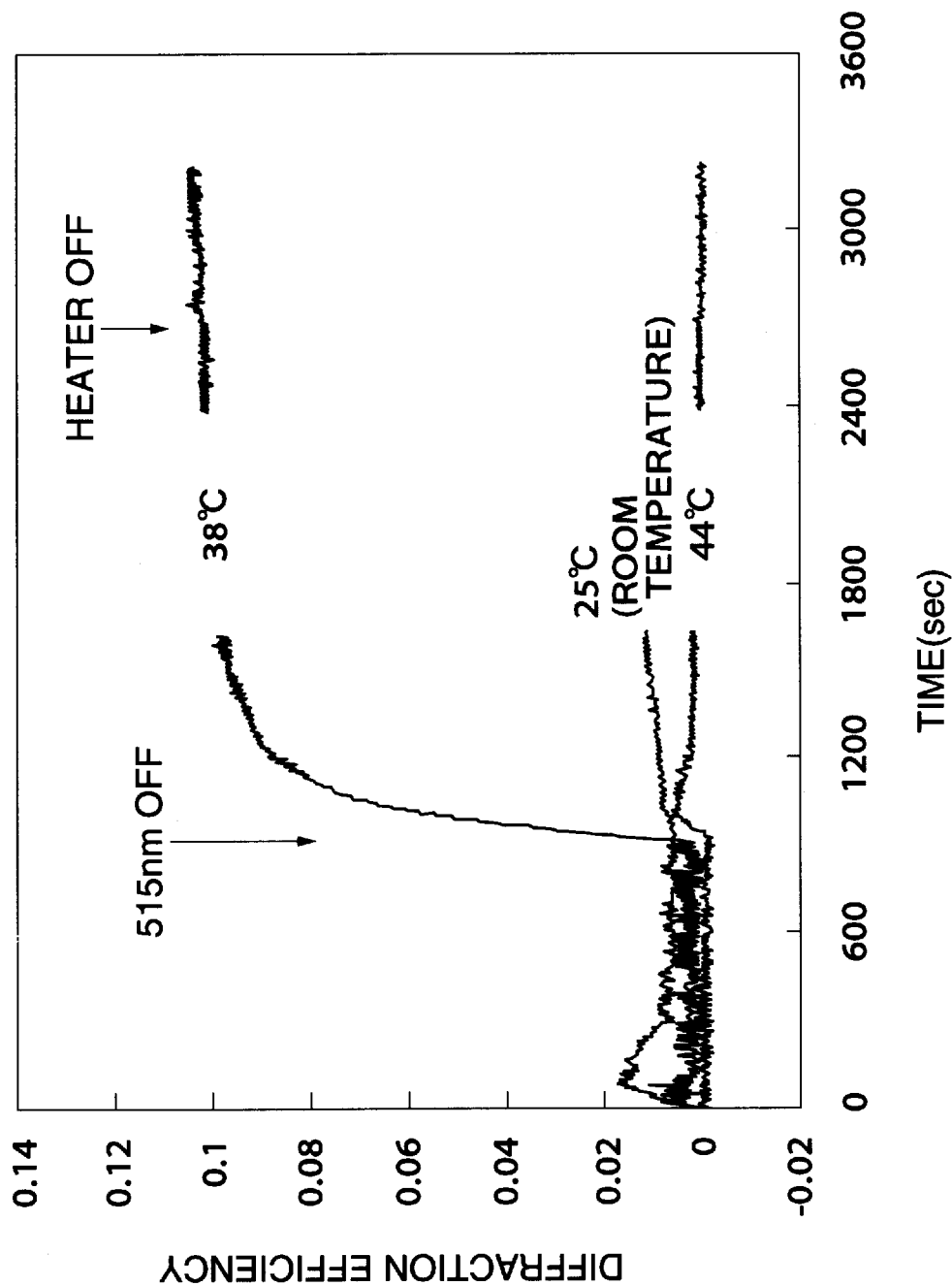
FIG. 15 is a graph showing the change of the diffraction efficiency according to the light orientation method of this invention.

FIG. 15 shows the change of the refractive efficiency when the temperature of the light orientation medium was controlled to 25° C., 38° C. and 44° C. by the temperature control device shown in FIG. 13.

In view of FIG. 15, the diffraction efficiency increased after shutting the polarized light. Particularly, at 38° C. corresponding to the glass transition temperature, the efficiency was increased indeed by about 25 times the diffraction efficiency in the step of the irradiating the polarized light, and a high diffraction efficiency in excess of 10% relative to the medium of 1.5 μm thickness could be attained. At a temperature higher than the glass transition point ($T_g$=38° C.), it could be confirmed that while the diffraction efficiency was attenuated when the polarized light was shutoff and the medium was left as it was, the efficiency just before turning off the light could be maintained by turning off the heater and allowing the medium to be cooled.

The effect of increasing the diffraction efficiency described above is the result of the effect for enhancing the birefringence in this invention. Since the pitch for the polarization holographic grating according to this invention is 1 μm, it can be seen that the effect of enhancing the birefringence of this invention has at least 1 μm of resolving power.

As described above, the light orientation method according to this invention can increase the birefringence while maintaining at least 1 μm of the resolving power and this can be applied to the manufacture of diffraction gratings and application to holographic memories. Compared with the existent method not having the temperature control device (refer to data at 25° C. in FIG. 15), the diffraction efficiency can be increased by about ten times, that is, by the order of one digit by using the light recording method according to this invention.

Further, when the effect of enhancing the birefringence according to this invention is applied to the holographic memory, it can provide the following advantages. At about a room temperature, birefringence that can be induced is smaller compared with that in the vicinity of $T_g$. Accordingly, birefringence recorded in the vicinity of $T_g$ can not completely be erased by the irradiation of the polarized light at a room temperature. Since in photorefractive crystals often used for the holographic memory material, in principle, even weak read light excites carriers and regenerates the recorded hologram while destroying the same, there is a limit for the number of readings. This brings about a big problem in practice. However, in the system according to this invention, when the intensity of read light is set within such a range as not rising the medium temperature (<1 W/cm$^2$), since the birefringence that can be induced by the read light does not reach the level of the birefringence induced upon recording, the recorded information can be stored stably.

According to this invention, when the photoisomerizable group or the photoisomerizable molecule is thermally isomerized (thermal back reaction), since the temperature of the polymeric film containing them is controlled in order to enhance the orientation of the photoisomerizable group or the photoisomerizable molecule induced by the thermal back reaction, isomerization/orientation from the cis-form to the trans-form can be induced effectively thereby greatly improving the effect of enhancing the birefringence after shutting off the polarized light. In addition, interaction exerting between the rigid segments of the side chains and/or the main chains also induces the orientation of the main chain thereby contributing to enhancement of the birefringence. This can not only shorten the orientation time but also can obtain high birefringence which was not possible in the prior art. Further, the isomerization reaction characteristic to this invention requires no high temperature for inducing the motion. Accordingly, it has higher resolving power than the prior art in enhancing the optional orientation state. Specifically, the effect of enhancing the birefringence showed at least 1 μm of the resolving power.

Accordingly, the liquid-crystal-aligning film and the wave plate (optical phase retarder) at high quality can be manufacture by utilizing the photoinduced anisotropy. Further, an optical element having high non-linearity can also be manufactured by efficiently arranging non-linear chromophore such as an azo dye.

Further, a large capacity optical memory such as for hologram or bit recording can be attained by efficiently recording the optical axis of the photoinduced birefringence. As described above, application use utilizing this invention covers the entire range of optical elements.

What is claimed is:

1. A method of providing a polymeric film with optical anisotropy by applying a polarized light to at least one of, a polymeric film containing a photoisomerizable group in a molecule, and a polymeric film containing a photoisomerizable molecule, in which the photoisomerizable group or the photoisomerizable molecule has a photochromic property capable of being isomerized by a thermal back reaction after being isomerized by light, the method comprising the two successive steps of:

applying a polarized light to the polymeric film; and shutting off the polarized light and leaving the polymeric film as it is, wherein a temperature of the polymeric film is controlled for enhancing the orientation of the at least one of the photoisomerizable group and the photoisomerizable molecule, induced by the thermal back reaction in at least one of the two steps.

2. A method according to claim 1, wherein the temperature of the polymeric film is controlled in both of the two steps.

3. A method according to claim 1, wherein the temperature is controlled such that the temperature of the polymeric film is within ±7° C. of a glass transition temperature $T_g$ of the polymer in at least one of the two steps.

4. A method according to claim 1, wherein the temperature is controlled such that the temperature of the polymeric film is at the glass transition temperature $T_g$ of the polymer in at least one of the two steps.

5. A method according to claim 1, wherein, in the step of shutting off the polarized light and leaving the polymeric film as it is, the temperature of the polymeric film is controlled so as to be equal to or higher than the temperature of the polymeric film in the step of applying the polarized light.

6. A method according to claim 1, wherein the time of applying the polarized light is set to $\tau_a$ or longer when the change of photoinduced birefringence Δn relative to the polarization light irradiation time τ in the step of applying the polarized light is approximated by the following biexponential equation:

$$\Delta n = A \cdot \{1 - \exp(-t/\tau_a)\} + B \cdot \{1 - \exp(-t/\tau_b)\} \ (\tau_a \leq \tau_b)$$

where Δn represents the photoinduced birefringence, A and B each represents contribution of each of the components to the birefringence, $\tau_A$ and $\tau_b$ each represents a time constant for each of relaxation components and t represents the time for irradiation of the polarized light.

7. A method according to claim 6, wherein the time of applying the polarized light is set to $6\tau_a$ or longer when the change of the photoinduced birefringence Δn relative to the polarization light irradiation time t in the step of irradiating the polarized light is approximated by the biexponential equation.

8. A method according to claim 1, wherein the temperature of the polymeric film is controlled by adjusting the irradiation intensity or irradiation power of the polarized light.

9. A method according to claim 1, wherein a main chain of the polymer contains an aromatic hydrocarbon ring.

10. A method according to claim 9, wherein the aromatic hydrocarbon ring is two or more benzene rings connected by way of a connection group.

11. A method according to claim 1, wherein the photoisomerizable group or the photoisomerizable molecule contains an azo group.

12. A method according to claim 1, wherein the polymer having the photoisomerizable group is a polymer in which an azobenzene derivative is introduced in the side chain.

13. A method according to claim 9, wherein the polymer having the photoisomerizable group is a polymer in which an azobenzene derivative is introduced in a side chain, and the azobenzene derivative is connected to the aromatic ring of the main chain.

14. A method according to claim 1, wherein the polymer having the photoisomerizable group is a polyester resin shown by the following structural formula:

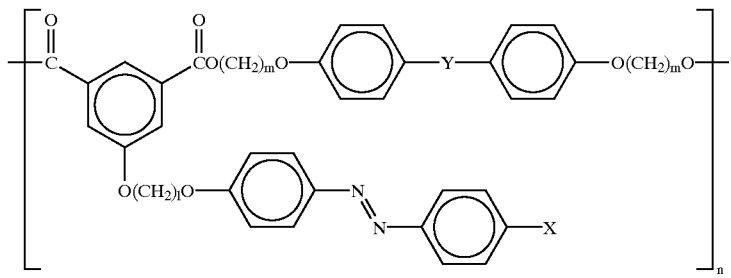

in which X represents a cyano group, a methyl group, a methoxy group or a nitro group, Y represents an ether bond or a ketone bond, l and m each represents an integer from 2 to 18 and n represents an integer from 5 to 500.

15. A method according to claim 14, wherein the polymer having the photoisomerizable group is a polyester resin of the structural formula, in which l and m each represents an integer from 4 to 10 and n represents an integer from 10 to 100.

16. An apparatus used for a method of providing a polymeric film with optical anisotropy by applying a polarized light to at least one of a polymeric film containing a photoisomerizable group in a molecule, and a polymeric film containing a photoisomerizable molecule, in which the photoisomerizable group or the photoisomerizable molecule has a photochromic property capable of being isomerized by a thermal back reaction after being isomerized by light, the apparatus comprising:

a light source for applying a polarized light to the polymeric film; and a temperature control unit that controls the temperature of the polymeric film.

17. An apparatus according to claim 16, wherein the light source also serves as the temperature control unit.

18. A polymeric film provided with optical anisotropy prepared by the method as described in claim 1.

19. An optical anisotropic medium having a polymeric film provided with optical anisotropy, the film being prepared by the method as described in claim 1.

20. A liquid-crystal-aligning film having a polymeric film provided with optical anisotropy, the film being prepared by the method as described in claim 1.

* * * * *